US012339607B2

(12) United States Patent
Hagiwara et al.

(10) Patent No.: US 12,339,607 B2
(45) **Date of Patent: *Jun. 24, 2025**

(54) IMAGE FORMING APPARATUS

(71) Applicant: CANON KABUSHIKI KAISHA, Tokyo (JP)

(72) Inventors: Hiroshi Hagiwara, Shizuoka (JP); Naoto Tsuchihashi, Kanagawa (JP); Yohei Suzuki, Shizuoka (JP); Seiji Hara, Shizuoka (JP); Yoshitaka Zaitsu, Chiba (JP); Masafumi Monde, Kanagawa (JP); Hiromitsu Kumada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,640

(22) Filed: Apr. 22, 2024

(65) Prior Publication Data

US 2024/0272573 A1 Aug. 15, 2024

Related U.S. Application Data

(63) Continuation of application No. 17/548,354, filed on Dec. 10, 2021, now Pat. No. 11,994,817.

(30) Foreign Application Priority Data

Dec. 17, 2020 (JP) ................................ 2020-209698

(51) Int. Cl.
*G03G 15/00* (2006.01)

(52) U.S. Cl.
CPC ......... *G03G 15/5029* (2013.01); *G03G 15/55* (2013.01); *G03G 15/6588* (2013.01);
(Continued)

(58) Field of Classification Search
CPC ..... G03G 15/5029; G03G 2215/00637; G03G 2215/00742; G03G 2215/00751;
(Continued)

(56) References Cited

U.S. PATENT DOCUMENTS 11,994,817 B2 * 5/2024 Hagiwara ............. G03G 15/55
2020/0310318 A1 * 10/2020 Suzuki .............. G03G 15/5029

* cited by examiner

*Primary Examiner* — Jeremy R Severson
(74) *Attorney, Agent, or Firm* — Canon U.S.A., Inc. IP Division

(57) ABSTRACT

An image forming apparatus includes a stack portion having recording materials, an image forming unit, a basis weight detection unit, an operating sound detection unit, and a mode selection unit. The basis weight detection unit detects a recording material basis weight based on an ultrasonic wave. The operating sound detection unit detect an abnormality of a generated operating sound. The mode selection unit selects, for each recording material fed to the image forming unit, between transmitting to the basis weight detection unit a first instruction for detecting the recording material basis weight and transmitting to the operating sound detection unit a second instruction for detecting the operating sound abnormality. In determining an interval at which each second instruction is transmitted, the mode selection unit determines the interval so that the interval and a cycle, in which properties of recording materials on the stack portion are repeated, do not continuously coincide.

11 Claims, 13 Drawing Sheets

(52) U.S. Cl.
CPC .................... *B65H 2553/30* (2013.01); *G03G 2215/00586* (2013.01); *G03G 2215/00637* (2013.01); *G03G 2215/00742* (2013.01)

(58) Field of Classification Search
CPC ..... G03G 15/6588; G03G 2215/00586; B65H 2553/30
See application file for complete search history.

| | FIRST TIME | SECOND TIME | THIRD TIME |
|---|---|---|---|
| SET | 5 | 6 | 8 |

IMAGE FORMING APPARATUS

CROSS-REFERENCE TO RELATED APPLICATIONS

The present application is a continuation of U.S. patent application Ser. No. 17/548,354, filed on Dec. 10, 2021, which claims priority from Japanese Patent Application No. 2020-209698, filed Dec. 17, 2020, which are hereby incorporated by reference herein in their entireties.

BACKGROUND OF THE DISCLOSURE

Field of the Disclosure

The present disclosure relates to an electrophotographic image forming apparatus.

Description of the Related Art

Heretofore, in an electrophotographic image forming apparatus having a sheet type determination function for reducing a burden of setting image forming conditions on a user, optimum image forming conditions are set according to the sheet determination result, thereby realizing power saving and image quality improvement. For example, Japanese Patent Application Laid-Open No. 2009-29622 discloses an image forming apparatus that detects a basis weight (mass per unit area) of a sheet from a transmittance of an ultrasonic wave applied to the sheet and determines a sheet type on the basis of a result of detecting the basis weight. In addition, as one maintenance function, there is known an image forming system that identifies an abnormal place in an image forming apparatus by detecting a sound generated when the image forming apparatus operates to form an image. Japanese Patent Application Laid-Open No. 2020-160237 discloses an image forming apparatus in which one receiving member serves as an ultrasonic receiver configured to detect a basis weight of a sheet and a sound collector configured to identify an abnormality.

However, in the multi-purpose configuration of the one receiving member described in Japanese Patent Application Laid-Open No. 2020-160237, it is difficult to simultaneously detect the basis weight of the sheet and the operating sound. Therefore, in a period during which a certain sheet (recording material) is conveyed between an ultrasonic wave transmitting member and an ultrasonic wave receiving member, a control may be performed to detect an operating sound in the first half period and detect a basis weight in the second half period. However, even in the second half period, there is a possibility that an abnormal sound may occur resulting from the conveyance of the sheet. Therefore, a control may be performed so that an abnormal sound can be detected at any timing during the conveyance of the sheet by either detecting an operating sound or detecting a basis weight for each sheet in a specific cycle. That is, only basis weight detection is performed in a period in which a certain sheet is conveyed, and only operating sound detection is performed in a period in which another sheet is conveyed.

However, in a case in which the control is performed to switch for each sheet to the detection of the operating sound or the detection of the basis weight, a result of the detection of the basis weight may deviate due to the cycle characteristic of properties. A sheet bundle used in an image forming apparatus is generally made by stacking sheets cut from a plurality of rolls. It is known that properties (basis weights) of a plurality of sheets cut from one roll slightly change with a specific cycle characteristic. Therefore, when the sheets in the bundle are sequentially investigated, properties of a plurality of sheets cut from a first roll change in a certain cycle, and properties of a plurality of sheets cut from a second roll change in another certain cycle. Here, in a case in which the cycle in which the properties change coincidentally coincides with a cycle in which an operating sound is detected, there is a possibility that deviation to one side may occur in the results of detecting the basis weights as compared with those in a case in which the cycle in which the properties change does not coincide with the cycle in which the operating sound is detected. Then, as the results of detecting the basis weights deviate to one side, for example, it may cause a problem in that a target temperature of the fixing device is lowered by several ° C., which causes an image defect, or conversely, the target temperature is raised by several ° C., which causes an increase in power consumption of the fixing device.

SUMMARY OF THE DISCLOSURE

Disclosed herein is an image forming apparatus that works towards achieving both accurate detection of properties of recording materials and detection of operating sounds.

An image forming apparatus includes a stack portion on which recording materials are to be stacked, a feeding unit configured to feed each of the recording materials stacked on the stack portion, an image forming unit configured to form an image on each of the recording materials fed by the feeding unit, a transmitter configured to transmit an ultrasonic wave, a receiver configured to receive the ultrasonic wave transmitted from the transmitter via the recording material and an operating sound generated in the image forming apparatus, a basis weight detection unit configured to detect a basis weight of the recording material based on an output from the receiver when the receiver receives the ultrasonic wave, an operating sound detection unit configured to detect an abnormality of the operating sound based on an output from the receiver when the receiver receives the operating sound, and a mode selection unit configured to select, for each of the recording materials fed to the image forming unit, between transmitting to the basis weight detection unit a first instruction for detecting the basis weight of the recording material and transmitting to the operating sound detection unit a second instruction for detecting the abnormality of the operating sound, wherein, in determining an interval at which each second instruction is transmitted, the mode selection unit determines the interval so that the interval and a cycle, in which properties of the recording materials stacked on the stack portion are repeated, do not continuously coincide.

Further features of the present disclosure will become apparent from the following description of exemplary embodiments with reference to the attached drawings.

DESCRIPTION OF THE EMBODIMENTS

Hereinafter, the embodiments of the present disclosure will be exemplarily described in detail with reference to the accompanying drawings. However, dimensions, materials, shapes, relative arrangements, and the like of components to be described below should be appropriately changed according to a configuration of an apparatus to which the present disclosure is applied and various conditions. Therefore, unless otherwise specified, the scope of the present disclosure is not limited thereto.

First Embodiment

Configuration of Image Forming Apparatus

Figure 1:
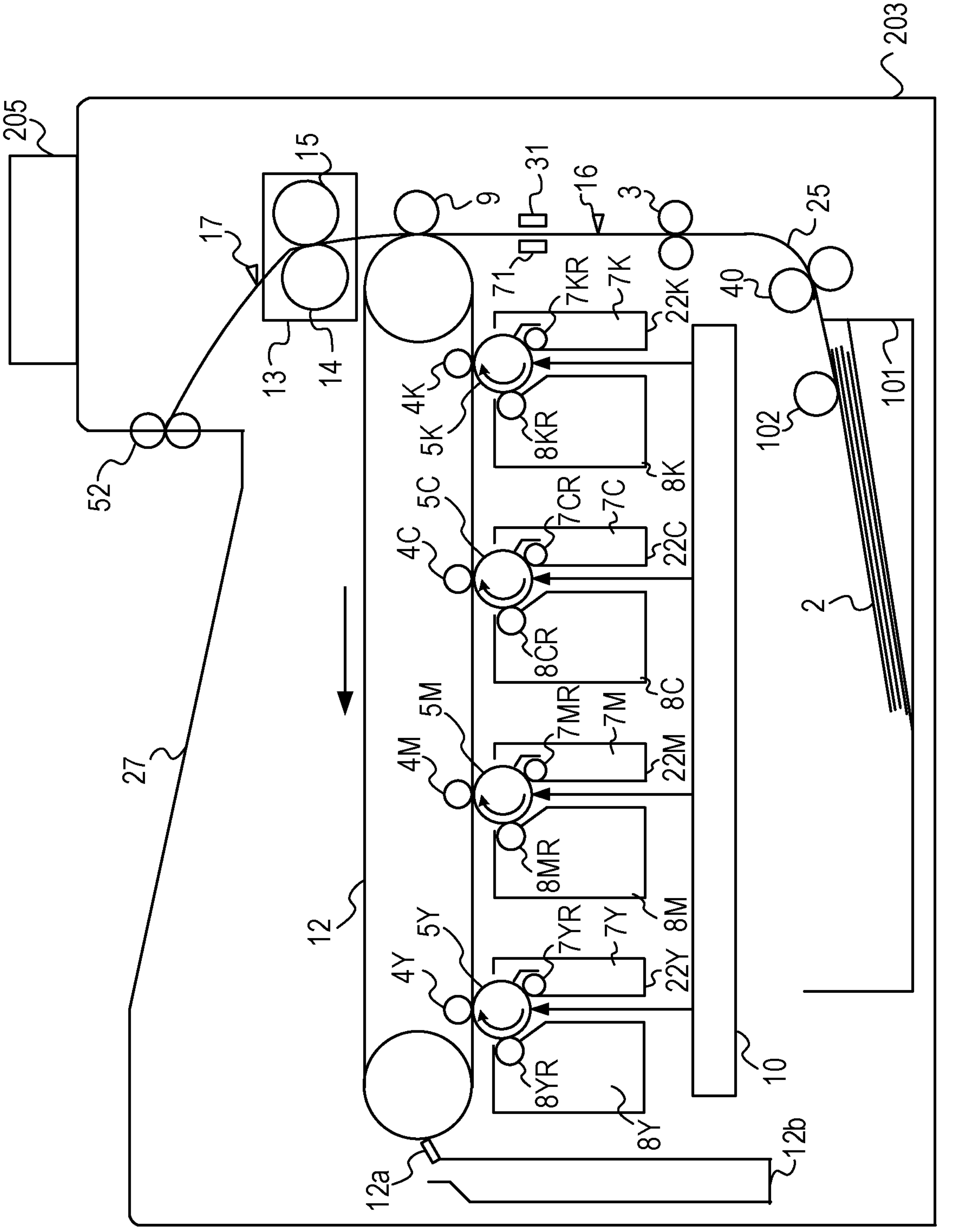
FIG. 1 is a cross-sectional view illustrating a configuration of an image forming apparatus according to a first embodiment.

An electrophotographic color image forming apparatus to which the present disclosure is applicable will be described. FIG. 1 is a cross-sectional view illustrating a schematic configuration of a tandem color laser beam printer 203 (hereinafter, referred to as the printer 203) in which a plurality of image forming units are arranged in parallel. The printer 203 is configured to form a color image by superimposing toner images of four colors of yellow (Y), magenta (M), cyan (C), and black (K), which are generated in respective process cartridges 22 as image forming units, on an intermediate transfer belt 12. The process cartridges 22 have the same configuration except that colors of toners are different. In reference signs of members constituting the process cartridges 22, Y, M, C, and K indicate that the members belong to the process cartridges of yellow, magenta, cyan, and black, respectively, which are the colors of toners. In the following description, for convenience of description, the suffixes Y, M, C, and K will be omitted from the reference signs when the members do not need to distinguish the colors of the toners from each other, except that a member having a specific toner color is referred to.

Each of the process cartridges 22 includes a photosensitive drum 5 as an image bearing member, a charging unit 7 configured to charge a surface of the photosensitive drum 5 to a uniform potential, and a developing unit 8 configured to form a toner image by attaching the toner to an electrostatic latent image formed on the photosensitive drum 5. Each of the process cartridges 22 is detachably mounted to the printer 203. The photosensitive drum 5 is formed by applying an organic photoconductive layer to an outer circumference of an aluminum cylinder, and is driven by a drive motor (not shown) to rotate in a direction (clockwise direction) indicated by an arrow in FIG. 1 according to an image forming operation. The charging unit 7 includes a charging roller 7R (7R collectively refers to 7YR, 7MR, 7CR, 7KR in FIG. 1), and the charging roller 7R charges the surface of the photosensitive drum 5 to a uniform potential. The scanner unit 10 forms an electrostatic latent image on the surface of the photosensitive drum 5 by irradiating the surface of the photosensitive drum 5 with a light beam according to an image signal. The developing unit 8 includes a developing roller 8R (8R collectively refers to 8YR, 8MR, 8CR, 8KR in FIG. 1), and the developing roller 8R forms a toner image on the photosensitive drum 5 by attaching the toner to the electrostatic latent image formed on the photosensitive drum 5.

While forming an image, the intermediate transfer belt 12 rotates in a direction (counterclockwise direction) indicated by an arrow in FIG. 1 in contact with the photosensitive drum 5 of each of the process cartridges 22. A primary transfer roller 4 is disposed at a position to face each of the photosensitive drums 5, and a primary transfer voltage is applied to the primary transfer roller 4, such that the toner images formed on the photosensitive drums 5 are transferred onto the intermediate transfer belt 12 in superposition to each other. A secondary transfer roller 9 abuts on the intermediate transfer belt 12 to form a transfer nip portion, in which the color toner image transferred to the intermediate transfer belt 12 is transferred to a sheet 2 conveyed from a cassette tray 101 to be described later. Each of the primary transfer rollers 4 and the secondary transfer roller 9 rotate as the intermediate transfer belt 12 rotates. The toner remaining on the intermediate transfer belt 12 without being transferred to the sheet 2 in the transfer nip portion is conveyed to a cleaning blade 12*a* to be scraped off and removed by the cleaning blade 12*a*, and the scraped-off toner is collected in a waste toner container 12*b*.

The cassette tray 101 is a stack portion on which sheets 2 as recording materials are accommodated and stacked. When an electromagnetic clutch (not shown) is set to a turn-on state, a driving force from a motor (not shown) is transmitted to a feed roller 102. Then, the feed roller 102 rotates in the counterclockwise direction in FIG. 1, and one sheet 2 is fed from the cassette tray 101. A conveying roller 40 as a conveyance unit conveys the sheet 2 fed by the feed roller 102 to a conveying path 25. After the sheet 2 is conveyed by the conveying roller 40, the electromagnetic clutch is set to a turn-off state, thereby releasing the transmission of the driving force to the feed roller 102 and stopping the feed roller 102. The sheet 2 fed by the feed roller 102 is conveyed to a registration roller 3. On the conveying path 25, a registration sensor 16 configured to detect the sheet 2 is disposed downstream of the registration roller 3 in a direction in which the sheet 2 is conveyed. The registration roller 3 conveys the sheet 2 to the transfer nip portion according to a timing when the registration sensor 16 detects a leading edge of the conveyed sheet 2.

The fixing unit 13 as a fixing portion is a unit configure to fix the toner image transferred on the sheet 2 as well as conveying the sheet 2 to which the toner image has been transferred in the transfer nip portion. The fixing unit 13 includes a fixing roller 14 configured to heat the sheet 2, and a pressing roller 15 configured to bring the sheet 2 into pressure contact with the fixing roller 14 while conveying the conveyed sheet 2. The fixing roller 14 and the pressing roller 15 are formed in a hollow shape, and a heater configured to heat the sheet 2 is built in the fixing roller 14. The sheet 2 to which the unfixed toner image has been transferred is conveyed while being heated and pressurized by the fixing roller 14 and the pressing roller 15, thereby fixing the toner image onto the surface of the sheet 2. The sheet 2 onto which the toner image has been fixed is discharged to a discharge tray 27 by a discharge roller 52, and the image forming operation is completed. A fixing discharge sensor 17 is disposed downstream of the fixing unit 13 in the direction in which the sheet 2 is conveyed, and the fixing discharge sensor 17 detects the sheet 2 having passed through the fixing unit 13.

On the conveying path 25 between the registration sensor 16 and the transfer nip portion, a transmitter 31 configured to transmit an ultrasonic wave and a receiver 71 configured to receive the ultrasonic wave transmitted by the transmitter 31 are arranged opposite to each other with the conveying path 25 interposed therebetween. The transmitter 31 includes a piezoelectric element (also referred to as the piezo element), which is an element for conversion between a mechanical displacement and an electric signal, and an electrode terminal. On the other hand, the receiver 71 includes a micro electro mechanical system (MEMS) microphone and an electrode terminal, the MEMS microphone converting a vibration displacement of a diaphragm caused by pressure into a voltage change and outputting the voltage change. In addition, an operation display unit 205 configured to operate an input and display information is provided in an upper portion of the printer 203.

Configuration of Control Unit

Figure 2:
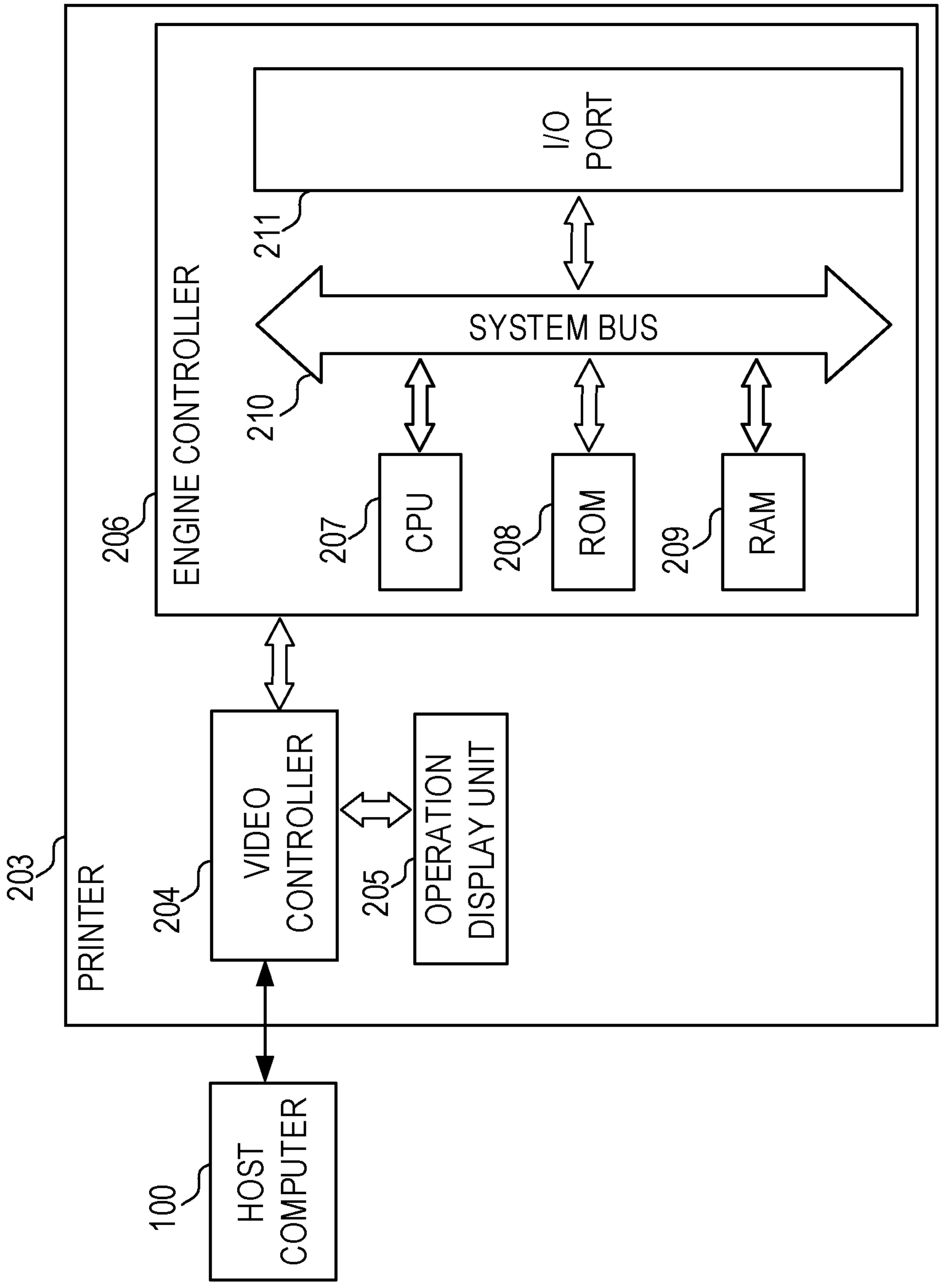
FIG. 2 is a configuration diagram illustrating a configuration of a control system according to the first and second embodiments.

FIG. 2 is a configuration diagram illustrating a configuration of a control unit of the printer 203 according to the present embodiment. The control unit of the printer 203 includes a video controller 204 and an engine controller 206. The video controller 204 receives print data with a print instruction transmitted from a host computer 100, which is an external device configured to issue a print request to the printer 203, and transmits the print data and the print instruction to the engine controller 206. In addition, the video controller 204 transmits a state of the printer 203 received from the engine controller 206 to the operation display unit 205, and the operation display unit 205 displays the state of the printer 203 received from the video controller 204. Furthermore, the operation display unit 205 is provided with an operation panel for a user to give an instruction to the printer 203, an operation button for inputting data, and the like.

The engine controller 206 includes a CPU 207, a ROM 208, and a RAM 209. Using the RAM 209 as a work area, the CPU 207 controls the printer 203 on the basis of a program and various data stored in the ROM 208. An actuator (not shown) controlling each unit for forming an image as explained with reference to FIG. 1 is connected to an I/O port 211. The CPU 207, the ROM 208, the RAM 209, and the I/O port 211 are connected to each other via a system bus 210 and accessible to each other bidirectionally. The CPU 207 drives each actuator via the system bus 210 and the I/O port 211 on the basis of a print command from the video controller 204 to control the conveyance of the sheet 2 and the formation of the image on the sheet 2.

Figure 3:
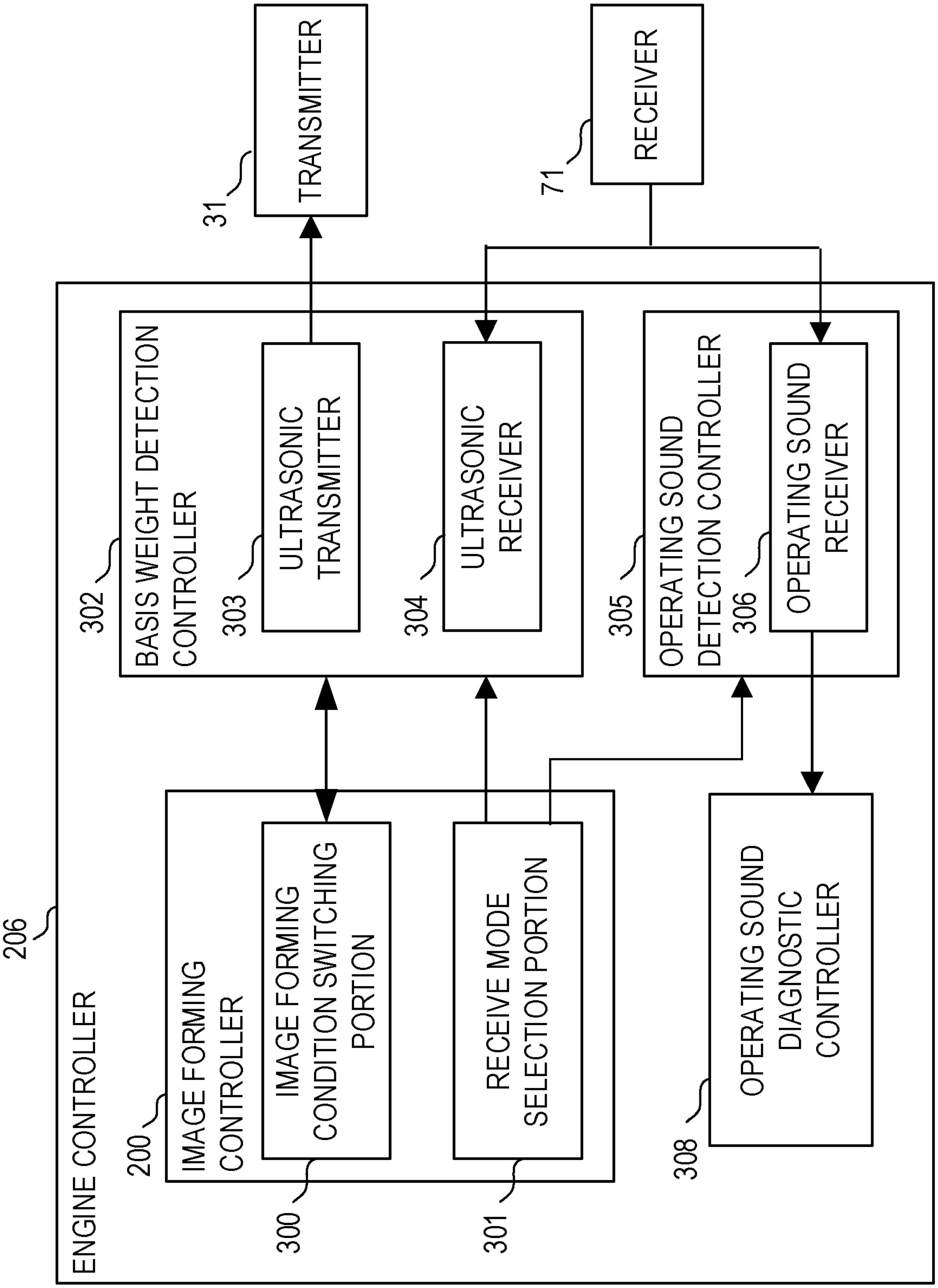
FIG. 3 is a functional block diagram of an engine controller according to the first and second embodiments.

Functional Blocks Concerning Detection of Basis Weight of Recording Material and Detection of Operating Sound Next, functions of the engine controller 206 related to detecting a basis weight of the sheet 2 and detecting an operating sound of the printer 203 will be described. FIG. 3 is a block diagram illustrating relationships of functional blocks related to detecting the basis weight of the sheet 2 and detecting the operating sound of the printer 203 in the engine controller 206 with the transmitter 31 and the receiver 71 described with reference to FIG. 1. The engine controller 206 includes four controllers: an image forming controller 200, a basis weight detection controller 302, an operating sound detection controller 305, and an operating sound diagnostic controller 308.

The image forming controller 200 controls an operation of forming an image on the sheet 2 such as controlling each process cartridge 22 and the scanner unit 10 and controlling the feeding of the sheet 2 from the cassette tray 101, and includes an image forming condition switching portion 300 and a receive mode selection portion 301. The image forming condition switching portion 300 switches image forming conditions at the time of forming an image on the sheet 2 on the basis of a result of detecting the basis weight of the sheet 2, which is acquired from the basis weight detection controller 302. In addition, the receive mode selection portion 301 instructs the basis weight detection controller 302 to start detecting a basis weight for detecting the basis weight of the conveyed sheet 2, and instructs the operating sound detection controller 305 to start detecting an operating sound for detecting the operating sound of the printer 203.

The basis weight detection controller 302 includes an ultrasonic transmitter 303 and an ultrasonic receiver 304. The ultrasonic transmitter 303 instructs the transmitter 31 to transmit an ultrasonic wave. The ultrasonic receiver 304 calculates a basis weight of the conveyed sheet 2 on the basis of an output signal from the receiver 71 that receives an ultrasonic wave transmitted from the transmitter 31 in response to an instruction from the receive mode selection portion 301, and stores the basis weight information. In response to a request from the image forming controller 200, the basis weight detection controller 302 transmits the basis weight information of the sheet 2 stored in the ultrasonic receiver 304 to the image forming controller 200.

The operating sound detection controller 305 includes an operating sound receiver 306. The operating sound receiver 306 generates operating sound information on the basis of an output signal regarding an operating sound of the printer 203 detected by the receiver 71. In response to an instruction from the receive mode selection portion 301, the operating sound detection controller 305 transmits the operating sound information generated by the operating sound receiver 306 to the operating sound diagnostic controller 308.

The operating sound diagnostic controller 308 determines whether or not there is an abnormality in the operating sound of the printer 203 on the basis of the operating sound information acquired from the operating sound detection controller 305. When it is determined that there is an abnormality in the operating sound of the printer 203, the operating sound diagnostic controller 308 transmits state information of the printer 203 to the video controller 204. On the basis of the state information of the printer 203 received from the operating sound diagnostic controller 308 of the engine controller 206, the video controller 204 displays the state of the printer 203 on the operation display unit 205 and transmits the state information of the printer 203 to the host computer 100. The function of each of the functional blocks described above is implemented by the CPU 207 of the engine controller 206 executing the program stored in the ROM 208.

Basis Weight Detection Control

Figure 4A:
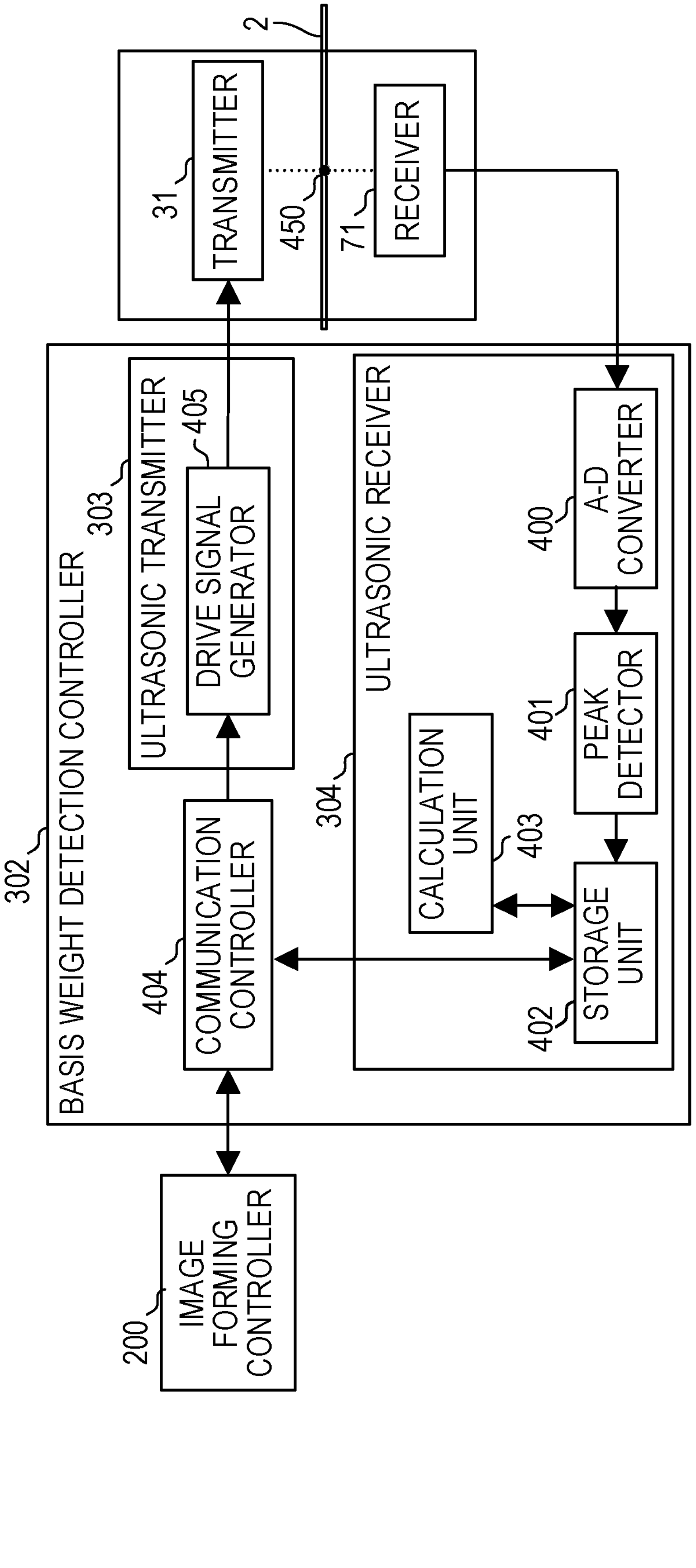
FIG. 4A is a functional block diagram of a basis weight detection controller according to the first and second embodiments.

Next, a basis weight detection control according to the present embodiment will be described. FIG. 4A is a diagram for explaining a configuration of a functional block of the basis weight detection controller 302 and relationships of the basis weight detection controller 302 with the image forming controller 200, the transmitter 31, and the receiver 71. Note that the basis weight in the present embodiment is a mass of the sheet 2 per unit area, and the unit is represented by [$g/m^2$].

In FIG. 4A, the transmitter 31 transmits an ultrasonic wave having a frequency of 32 KHz, and the receiver 71 receives the ultrasonic wave having the frequency of 32 KHz that is transmitted from transmitter 31. The frequency of the ultrasonic wave is set in advance, and the frequency may be selected in an appropriate range according to the configurations of the transmitter 31 and the receiver 71, the detection accuracy, and the like.

The basis weight detection controller 302 includes a communication controller 404, an ultrasonic transmitter 303, and an ultrasonic receiver 304. Upon receiving an instruction to start detecting a basis weight of the sheet 2 from the receive mode selection portion 301 of the image forming controller 200 via the communication controller 404, the ultrasonic transmitter 303 instructs a drive signal generator 405 to generate a drive signal for detecting the basis weight. Upon receiving an instruction to generate a drive signal, the drive signal generator 405 generates a drive signal and outputs the drive signal to the transmitter 31. The transmitter 31 outputs an ultrasonic wave according to the drive signal output from drive signal generator 405. On the other hand, when receiving the ultrasonic wave transmitted from the transmitter 31, the receiver 71 outputs the ultrasonic wave to the ultrasonic receiver 304 of the basis weight detection controller 302. The transmission of the ultrasonic wave from the transmitter 31 is performed in a state in which the sheet 2 does not exist (in a state in which the sheet 2 has not been conveyed) and in a state in which the sheet 2 exists (in a state in which the sheet 2 is passing) on the conveying path between the transmitter 31 and the receiver 71.

The ultrasonic receiver 304 includes an A-D converter 400, a peak detector 401, a storage unit 402, and a calculation unit 403. The A-D converter 400 receives an analog signal output from the receiver 71, converts the input analog signal into a digital signal, and outputs the digital signal to the peak detector 401. The peak detector 401 receives the digital signal output from the A-D converter 400, detects a peak value (maximum value) of the input digital signal, and causes the storage unit 402 to store the peak value therein. In addition, the peak detector 401 causes the storage unit 402 to store peak values of digital signals in the state in which the sheet 2 does not exist and in the state in which the sheet 2 exists at a detection position 450 on the conveying path between the transmitter 31 and the receiver 71. The calculation unit 403 calculates an attenuation coefficient (a value corresponding to the basis weight of the sheet 2) of the conveyed sheet 2 from a ratio between the peak value of the digital signal in the state in which the sheet 2 does not exist and the peak value of the digital signal in the state in which the sheet 2 exists, the peak values being stored in the storage unit 402, and stores the attenuation coefficient in the storage unit 402. The image forming condition switching portion 300 of the image forming controller 200 acquires the attenuation coefficient information of the sheet 2 stored in the storage unit 402 of the ultrasonic receiver 304 via the communication controller 404, and switches conditions for forming an image on the sheet 2 on the basis of the acquired attenuation coefficient information. The conditions for forming an image on the sheet 2 are changed according to the basis weight which is the attenuation coefficient information of the sheet 2. The image forming conditions in the present embodiment are, for example, a conveyance speed of the sheet 2, a voltage applied to the secondary transfer roller 9, and a target temperature of the heater in the fixing unit 13.

Operating Sound Detection Control

Figure 4B:
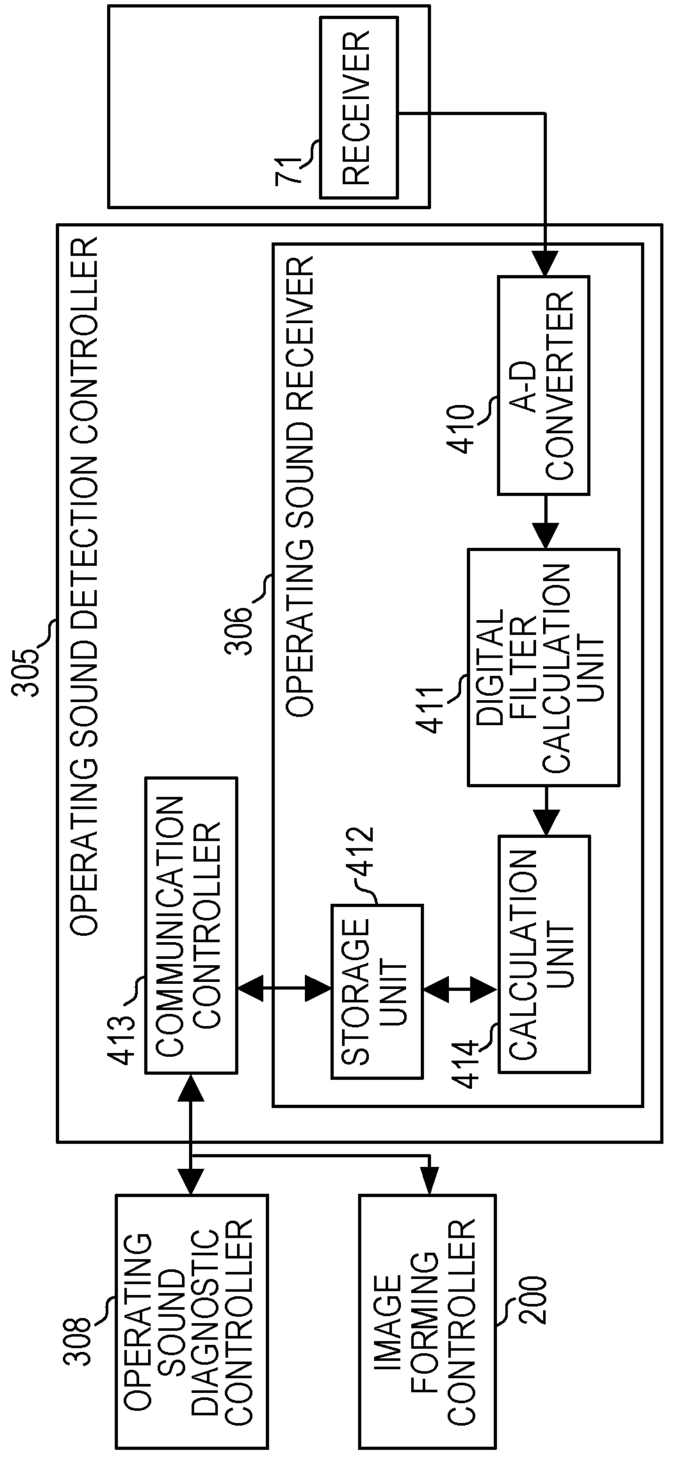
FIG. 4B is a functional block diagram of an operating sound detection controller according to the first and second embodiments.

Next, an operating sound detection control according to the present embodiment will be described. FIG. 4B is a diagram for explaining a configuration of a functional block of the operating sound detection controller 305 and relationships of the operating sound detection controller 305 with the image forming controller 200, the operating sound diagnostic controller 308, and the receiver 71. In a case in which an operating sound is detected, the receiver 71 used at the time of detecting a basis weight is used to receive an operating sound inside the printer 203. The receiver 71 includes the MEMS microphone. Since the diaphragm is displaced even at a sound pressure in an audible range, the MEMS microphone can also output the detected operating sound inside the printer 203 as a voltage signal (analog signal).

The operating sound detection controller 305 includes the operating sound receiver 306 and a communication controller 413. Upon receiving an instruction to start detecting an operating sound from the receive mode selection portion 301 of the image forming controller 200 via the communication controller 413, the operating sound detection controller 305 starts an operating sound detection control in the printer 203. The operating sound receiver 306 includes an A-D converter 410, a digital filter calculation unit 411, a calculation unit 414, and a storage unit 412.

The A-D converter 410 receives an analog signal (voltage signal) output from the receiver 71, converts the input analog signal into a digital signal, and outputs the digital signal to the digital filter calculation unit 411. In order to increase detection accuracy, the digital filter calculation unit 411 applies a filter suitable for an operating sound of a target member selected in advance by the receive mode selection portion 301 to the digital signal input from the A-D converter 410. The digital filter calculation unit 411 generates a signal through filter calculation (filter processing), in which only an operating sound in a specific frequency domain is extracted from the digital signal input from the A-D converter 410, and outputs the generated signal to the calculation unit 414. The calculation unit 414 performs square calculation or interval average calculation with respect to the signal subjected to the filter calculation in the digital filter calculation unit 411 in order to facilitate comparison in sound magnitude at the time of diagnosing an abnormal sound. In the present embodiment, an interval in which the interval average calculation is performed is set to 100 ms (milliseconds), but is not limited thereto. For example, a plurality of intervals may be provided to be selectable, or the interval may be set arbitrarily. The signal subjected to the interval average calculation is stored in the storage unit 412 as a signal level of the operating sound.

The operating sound diagnostic controller 308 acquires the operating sound data stored in the storage unit 412 of the operating sound receiver 306 via the communication controller 413, and determines whether the signal level of the acquired operating sound data exceeds an abnormality determination threshold value selected in advance for a member that needs to be diagnosed. When the signal level of the acquired operating sound exceeds the abnormality determination threshold value, the operating sound diagnostic controller 308 diagnoses that an abnormal sound is generated in the member that needs to be diagnosed. Thereafter, the operating sound diagnostic controller 308 instructs the engine controller 206 to perform a control to suppress the generation of the abnormal sound, displays a place in which the abnormal sound is generated on the operation display unit 205, notifies a maintenance center via a network to which the printer 203 is connected of the state of the printer 203, and the like.

Cycle Characteristic of Properties

As described above, a sheet bundle for a printer used in an office is often made by stacking sheets cut from a plurality of rolls. In a case in which properties are different from each other from roll to roll, a sheet bundle created from the plurality of rolls has a cycle characteristic in which change in the properties are periodic. Therefore, when such the sheet bundle is placed on the cassette tray 101 and fed at the time of forming images, the sheets having different properties are fed from one sheet feeding port in a certain cycle.

FIGS. 5A, 5B, 5C, and 5D are graphs illustrating average values of basis weights of the sheets 2 acquired from the basis weight detection controller 302 in feeding order in each cycle group, with the basis weights of the sheets 2 being divided into cycle groups of a four sheets cycle to a seven sheets cycle by the image forming condition switching portion 300 of the image forming controller 200. The graphs of FIGS. 5A to 5D illustrate the average values of the basis weights of the sheets 2 in feeding order in each cycle group in a case in which the sheet 2 having basis weights of 90 $g/m^2$, 90 $g/m^2$, 90 $g/m^2$, 90 $g/m^2$, and 60 $g/m^2$ are periodically fed. FIGS. 5A, 5B, 5C, and 5D are graphs illustrating the average values of the basis weights of the sheets 2 in a 4 sheets cycle, in a 5 sheets cycle, in a 6 sheets cycle, and in a 7 sheets cycle, respectively. In FIGS. 5A to 5D, the vertical axis represents the basis weight ($g/m^2$) of the sheet 2, and the horizontal axis represents an order in which the sheets 2 are fed in each cycle.

Figure 5A:
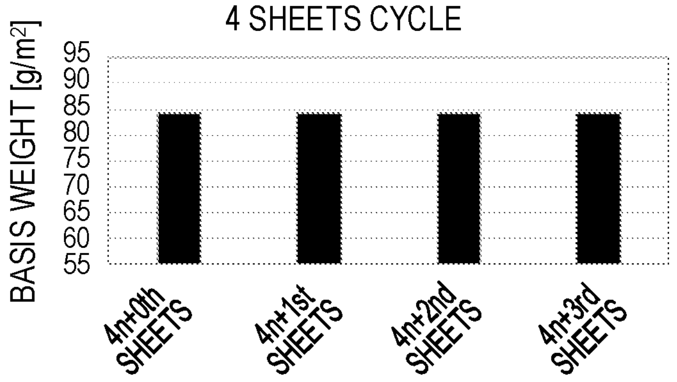
FIGS. 5A, 5B, 5C, and 5D are diagrams for explaining detection of a cycle characteristic of a sheet bundle according to the first and second embodiments.
Figure 5B:
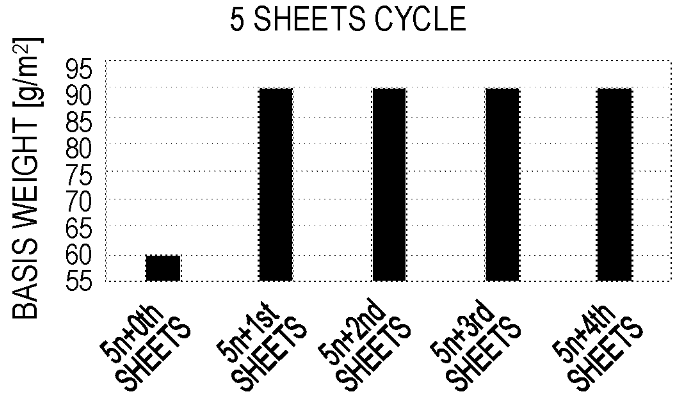
Figure 5C:
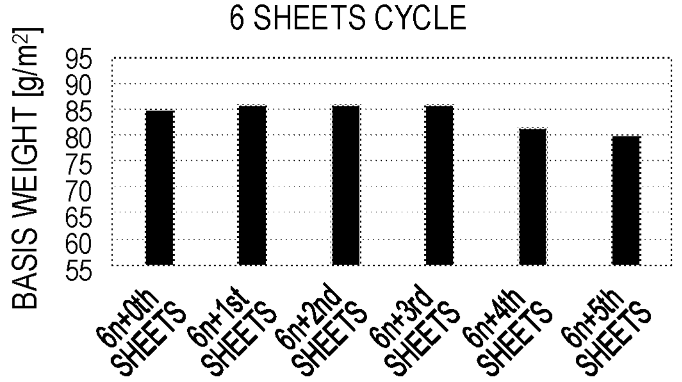
Figure 5D:
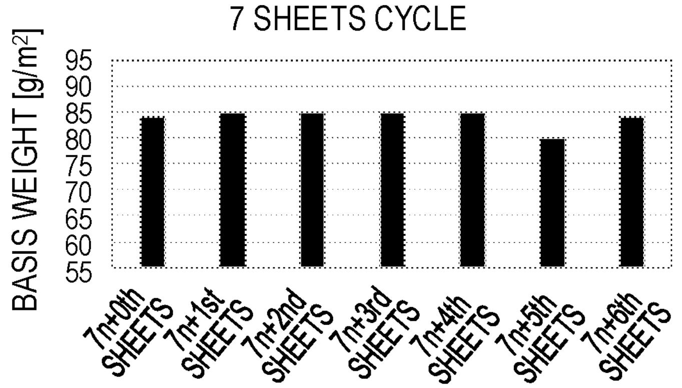

How to view the drawings of FIGS. 5A to 5D, i.e., the average values of the basis weights illustrated, will be described. In the 4 sheets cycle of FIG. 5A, (4n+0th) sheet indicates an average value of basis weights of sheets 2 fed fourthly, eighthly, twelfthly . . . , among the fed sheets 2. Similarly, (4n+1st) sheets indicate an average value of basis weights of sheets fed firstly, fifthly, ninthly . . . , and (4n+2nd) sheets indicate an average value of basis weights of sheets fed secondly, sixthly, tenthly . . . . In addition, (4n+3rd) sheets indicate an average value of basis weights of sheets fed thirdly, seventhly, eleventhly . . . . FIG. 5B for the 5 sheets cycle, FIG. 5C for the 6 sheets cycle, and FIG. 5D for the 7 sheets cycle are the same in how to view the drawings, while being different in the number of the sheets 2 per cycle.

As described above, FIGS. 5A to 5D illustrate examples of cycles of properties (here, basis weights) of the sheet bundle, but there are variations in property as illustrated in FIGS. 5A to 5D. Therefore, in the present embodiment, at the time of determining image forming conditions from results of detecting basis weights of the sheet 2 acquired from the basis weight detection controller 302, the image forming condition switching portion 300 determines the image forming condition on the basis of an average value of the latest several-time results of detecting the basis weights. As a result, the image forming conditions, such as a target temperature as a fixing temperature of the fixing unit 13, are greatly changed depending on the cycle of properties of the sheets 2 and the timing at which the basis weight is detected, thereby preventing print quality from being unstable.

Image Forming Condition Switching Control

Next, a control of the image forming condition switching portion 300 configured to switch the image forming conditions on the basis of the results of detecting the basis weights of the sheets 2 will be described. In the present embodiment, assuming that sheet bundles in which properties (here, basis weights) of the sheets 2 are repeated in 3 sheets cycle to 8 sheets cycle are used, image forming conditions for the sheets 2 are determined using an average value of results of detecting basis weights of the latest eight sheets 2.

Figure 5E:
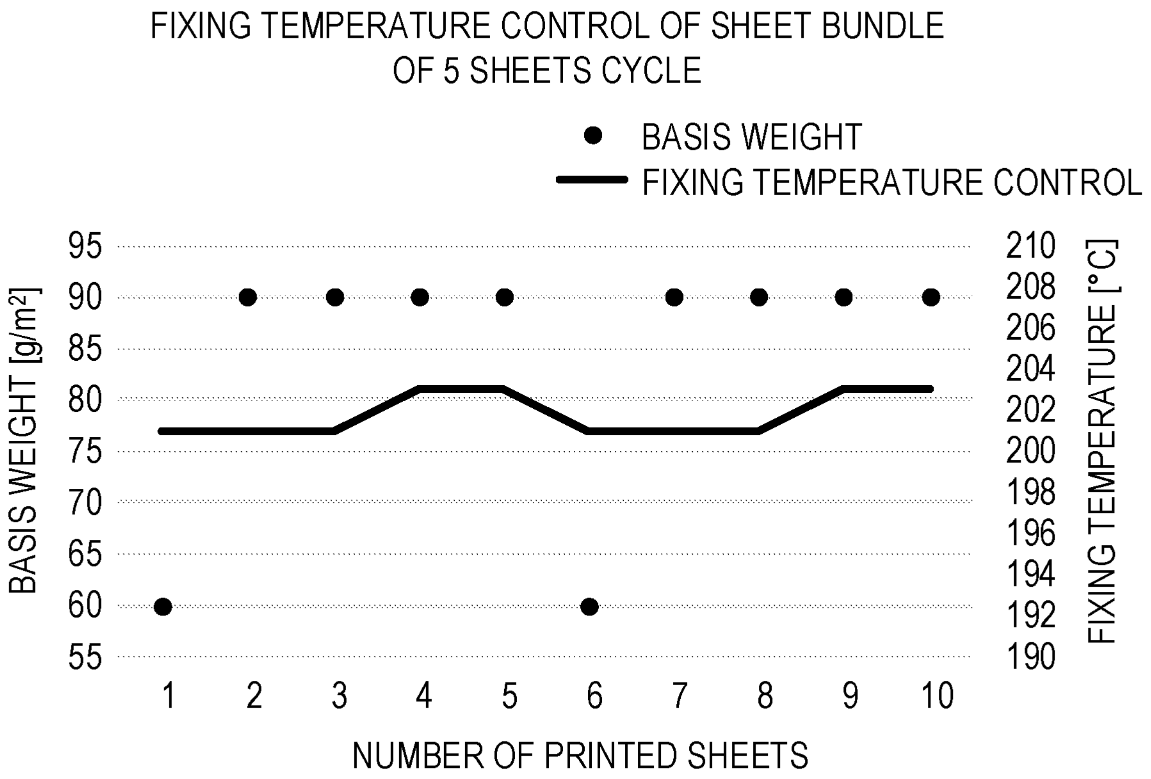
FIG. 5E is a diagram for explaining a control to switch image forming conditions for the sheet bundle according to the first and second embodiments.

FIG. 5E is a diagram for explaining an example in which the image forming condition switching portion 300 switches the fixing temperature of the fixing unit 13 with respect to a sheet bundle in which properties of the sheets 2 fed from the cassette tray 101 change in a 5 sheets cycle. In FIG. 5E, the vertical axis on the left side indicates the basis weight ($g/m^2$) of the sheet 2, the vertical axis on the right side indicates the fixing temperature (° C.) of the fixing unit 13, and the horizontal axis indicates the number of printed sheets (described as the number of printed sheets in FIG. 5E) (first to tenth sheets) representing an order in which the sheets 2 fed in a print job are printed. In addition, a black circle indicates a basis weight of the fed sheet 2, and a solid-line graph indicates a change in fixing temperature (described as fixing temperature control in FIG. 5E) of the fixing unit 13 according to an average basis weight of the sheets 2.

In FIG. 5E, the fixing temperature of the fixing unit 13 is switched according to an average basis weight of the latest eight sheets 2 including the fed sheet 2. For example, in FIG. 5E, while the basis weight of the first sheet 2 is 60 $g/m^2$, the basis weights of the latest seven sheets 2 fed before the first sheet 2 are 90 $g/m^2$, 90 $g/m^2$, 60 $g/m^2$, 90 $g/m^2$, 90 $g/m^2$, 90 $g/m^2$, and 90 $g/m^2$, respectively. Therefore, an average basis weight of the latest eight sheets 2 including the first sheet 2 at the time of feeding the first sheet 2 is 82.5 $g/m^2$, and a fixing temperature corresponding to the calculated average basis weight is set to 201° C. A fixing temperature when the second sheet 2 (whose basis weight is 90 $g/m^2$) is fed and when the third sheet 2 (whose basis weight is 90 $g/m^2$) is fed is also set to 201° C. However, when the fourth sheet 2 (whose basis weight is 90 $g/m^2$) is fed, the basis weights of the latest seven sheets 2 fed before the fourth sheet 2 are 90 $g/m^2$, 90 $g/m^2$, 90 $g/m^2$, 90 $g/m^2$, 60 $g/m^2$, 90 $g/m^2$, and 90 $g/m^2$, respectively. Therefore, an average basis weight of the latest eight sheets 2 including the fourth sheet 2 at the time of feeding the fourth sheet 2 is 87.5 $g/m^2$, and a fixing temperature corresponding to the calculated average basis weight is set to 203° C. Then, a fixing temperature when the fifth sheet 2 (whose basis weight is 90 g/m$^2$) is fed is also set to 203° C. However, when the sixth to eighth sheets 2 are fed, a fixing temperature corresponding to a calculated average basis weight is set to 201° C., and when the ninth and tenth sheets 2 are fed, a fixing temperature corresponding to a calculated average basis weight is set to 203° C. As described above, the fixing temperature corresponding to the calculated average basis weight is switched to 203° C. or 201° C. depending on whether the latest eight fed sheets 2 include one or two sheets 2 having the basis weight of 60 g/m$^2$.

Although the average value of the latest several-time results of detecting the basis weights is used for setting the fixing temperature in the present embodiment, a maximum value of the basis weights, an average value of weighted basis weights, or the like may be used. In addition, although the image forming condition switching portion 300 uses the basis weight as property information in the present embodiment, the image forming conditions may be determined using the basis weight together with another property information. For example, in order to detect a smoothness of a surface of the sheet 2, the sheet 2 may be irradiated with a light beam. Then, the image forming conditions may be determined using a result of measuring an amount of light reflected from the irradiated light together with the basis weight.

Method of Determining Operating Sound Detection Timing

Figures 6A, 6B:
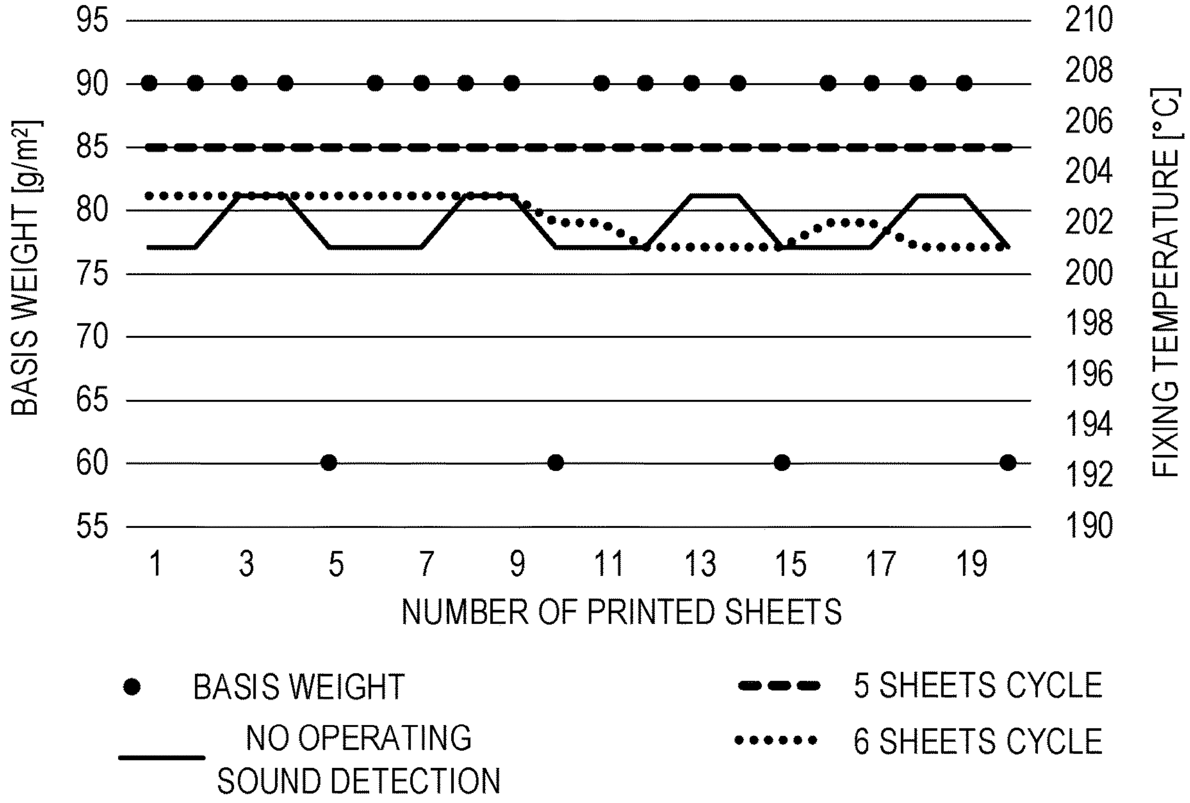
FIG. 6A is a diagram for explaining an effect of an operating sound detection timing according to the first and second embodiments.
FIG. 6B is a diagram illustrating an operating sound detection timing table according to the first and second embodiments.

Next, a method in which the receive mode selection portion 301 determines an operating sound detection timing considering a cycle of properties of the sheets 2 will be described. First, with reference to FIG. 6A, it will be described what harmful effect occurs in a case in which a cycle characteristic of properties coincides with an interval at which an operating sound detection control is executed. FIG. 6A is a diagram illustrating a change in fixing temperature according to results of detecting basis weights, with respect to a sheet bundle in which properties of the sheets 2 fed from the cassette tray 101 change in the 5 sheets cycle, in a case in which no operating sound measurement is performed, in a case in which operating sound measurement is performed in the 5 sheets cycle, and in a case in which operating sound measurement is performed in the 6 sheets cycle. In FIG. 6A, the vertical axis on the left side indicates the basis weight (g/m$^2$) of the sheet 2, the vertical axis on the right side indicates the fixing temperature (° C.) of the fixing unit 13, and the horizontal axis indicates the number (order) of fed sheet 2 (first to twentieth sheets). In addition, a black circle indicates the basis weight of the fed sheet 2, and a solid-line graph indicates a change in fixing temperature of the fixing unit 13 corresponding to an average basis weight of the sheets 2 in a case in which no operating sounds are detected. Further, a broken-line graph indicates a change in fixing temperature of the fixing unit 13 corresponding to an average basis weight of the sheets 2 in a case in which operating sound detection is performed in the 5 sheets cycle, and a dotted-line graph indicates a change in fixing temperature of the fixing unit 13 corresponding to an average basis weight of the sheets 2 in a case in which operating sound detection is performed in the 6 sheets cycle. In addition, in FIG. 6A, the sheets 2 whose basis weights are 90 g/m$^2$, 90 g/m$^2$, 90 g/m$^2$, 90 g/m$^2$, and 60 g/m$^2$ are fed in the 5 sheets cycle.

As illustrated in FIG. 6A, the fixing temperature changes in a range of about 201 to 203° C. in a case in which no operating sound measurement is performed and in a case in which the operating sound measurement is performed in the 6 sheets cycle. On the other hand, in a case in which the operating sound measurement is performed in the 5 sheets cycle, since the operating sound measurement timing coincides with a timing at which the sheet 2 having the basis weight of 60 g/m$^2$ is fed, an average basis weight of the sheets 2 is 90 g/m$^2$. Thus, a fixing temperature corresponding to the average basis weight is 205° C. The case in which the operating sound measurement is performed in the 5 sheets cycle is different in that the fixing temperature is stable at 205° C., as compared with the case in which no operating sound measurement is performed or the case in which operating sound measurement is performed in the 6 sheets cycle. As described above, since the timing at which the operating sound is measured and the cycle of the properties of the fed sheets 2 coincide with each other, deviations occur in the results of detecting the properties (basis weights) of the sheet 2. As a result, the image forming condition switching portion 300 may control the fixing temperature differently from the expected operation.

The image forming conditions of the printer 203 are designed to be optimal when the basis weights of the sheets 2 are continuously detected without measuring the operating sound. Accordingly, deviations occur in the results of detecting the properties of the sheets 2. As a result, if image formation is continued under the image forming conditions corresponding to the deviated properties, there is a possibility that quality degradation such as an image defect occurs. Specifically, in a case in which image formation is continued at a fixing temperature higher than the expected temperature, the power consumption of the printer 203 increases. On the other hand, in a case in which image formation is continued at a fixing temperature lower than the expected temperature, a temperature at which the sheet 2 is heated in the fixing unit decreases, and accordingly, the toner may fail to be appropriately fixed to the sheet 2. Even though the image forming condition deviates merely at several percent as described above, the influence becomes significant by continuously forming images on the sheets 2. Therefore, it is necessary to prevent the occurrence of the above-described harmful effect by performing a control such that an average basis weight obtained by averaging results of detecting basis weights of a plurality of sheets even in a case in which operating sound measurement is performed is equal to that in a case in which no operating sound measurement is performed.

In the present embodiment, the receive mode selection portion 301 determines an operating sound detection executing interval (executing timing) on the basis of an operating sound detection timing table illustrated in FIG. 6B, so that the assumed cycle of properties and the operating sound detection timing do not continuously coincide with each other. FIG. 6B is a table illustrating a timing (executing interval) at which the receive mode selection portion 301 detects an operating sound of the printer 203. The receive mode selection portion 301 determines an interval at which the operating sound detection control is executed by referring to values in the table illustrated in FIG. 6B (each indicating the number of the sheet 2 at which operating sound detection is performed) sequentially from the first one in a repeated manner. In FIG. 6B, a first operating sound detection timing is a timing at which a fifth sheet 2 from the previous operating sound detection timing is fed, and a second operating sound detection timing is a timing at which a sixth sheet 2 from the first operating sound detection timing is fed. Further, a third operating sound detection timing is a timing at which an eighth sheet 2 from the second operating sound detection timing is fed. Then, returning to the beginning of the table illustrated in FIG. 6B, a fourth operating sound detection timing is a timing at which a fifth sheet 2 from the third operating sound detection timing is fed. After determining a timing (interval) at which operating sound detection is executed by sequentially referring to the values in the table illustrated in FIG. 6B in a repeated (circulating) manner as described above, the receive mode selection portion 301 instructs the operating sound detection controller 305 to detect an operating sound.

The values in the table illustrated in FIG. 6B (the number of the sheet 2 at which operating sound detection is performed) are determined on the basis of the following three conditions.

(Condition 1): The values in the table include two or more positive integers, and the sum S of the values is larger than a maximum value Tpmax of an assumed property cycle of the sheets 2.

(Condition 2): The sum S is relatively prime to any of the assumed property cycles Tp of the sheets 2.

(Condition 3): In a case in which a "set" of values constituting the values in the table is divided into two or more groups Gi, the greatest common divisor GCD of a sum Sgi of values of each group and a sum Sgi' of values of another adjacent group among permutations in the "set" does not coincide with the assumed property cycles Tp of the sheets 2. However, a group including values of which the sum Sgi is larger than the maximum value Tpmax of the property cycles Tp of the sheets 2 is excluded.

Specifically, the set of values {5, 6, 8} illustrated in the table of FIG. 6B satisfies the above-described conditions 1 to 3 with respect to the assumed property cycles Tp {3, 4, 5, 6, 7, 8}. The sum S of the set of values {5, 6, 8} is 19 (=5+6+8), and the sum S is larger than the maximum value Tpmax of the property cycles of the sheets 2, i.e., 8. Thus, the set {5, 6, 8} satisfies the above-described condition 1. In addition, the sum S, i.e., 19, which is a prime number, is relatively prime to the property cycles Tp of the sheets 2, i.e. {3, 4, 5, 6, 7, 8}. Thus, the set {5, 6, 8} satisfies the above-described condition 2. Subsequently, for the condition 3, the set {5, 6, 8} is divided into a plurality of groups first, and a sum for each group is calculated. As combinations of values in the set {5, 6, 8}, {5, 6}, {6, 8}, {8, 5}, {5, 14(=6+8)}, and {11(=5+6), 8} are considered. {8, 5} is included as a combination because the values are adjacent to each other when the repeated values, 5→6→8→5→ . . . , are referred to. The greatest common divisor GCD in the combinations are obtained, except combinations {5, 14} and {11, 8} each including a value larger than the maximum value Tpmax of the property cycles Tp of the sheets 2, i.e., 8. The greatest common divisor GCD in the set (5, 6) is 1, the greatest common divisor GCD in the set (6, 8) is 2, and the greatest common divisor GCD in the set (8, 5) is 1. None of the greatest common divisors is included in {3, 4, 5, 6, 7, 8}, which are the property cycles Tp of the sheets 2. Thus, the set {5, 6, 8} satisfies the above-described condition 3.

Figure 6C:
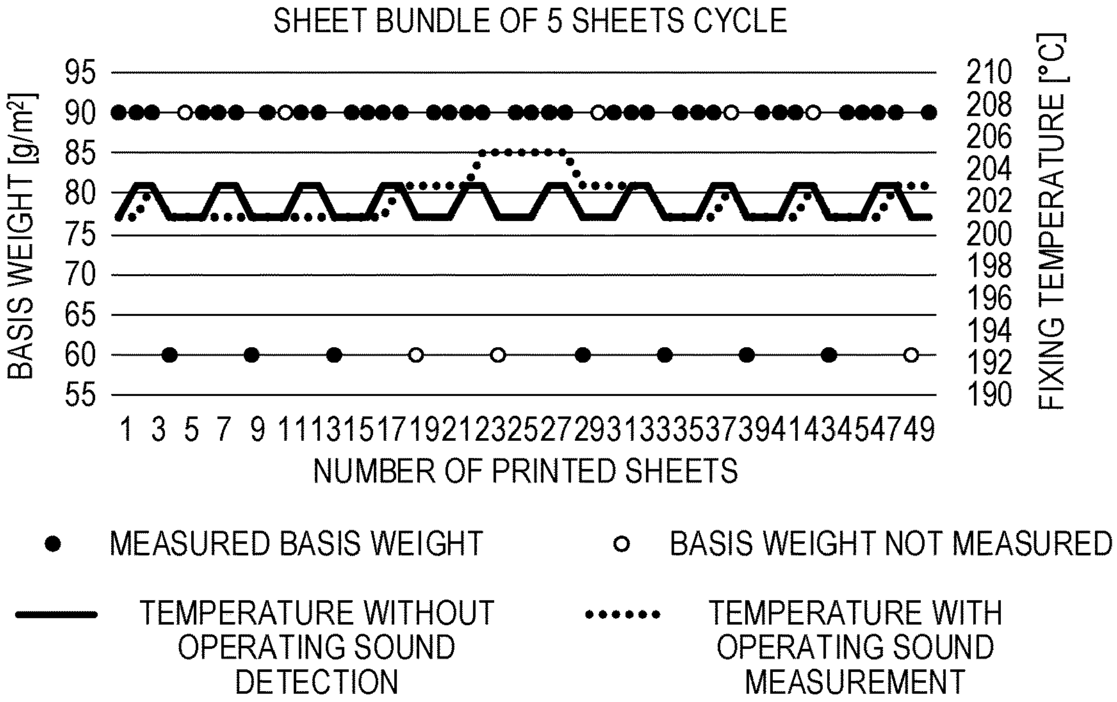
FIGS. 6C, 6D, 6E, and 6F are diagrams for an effect of an operating sound detection timing according to the first and second embodiments.
Figure 6D:
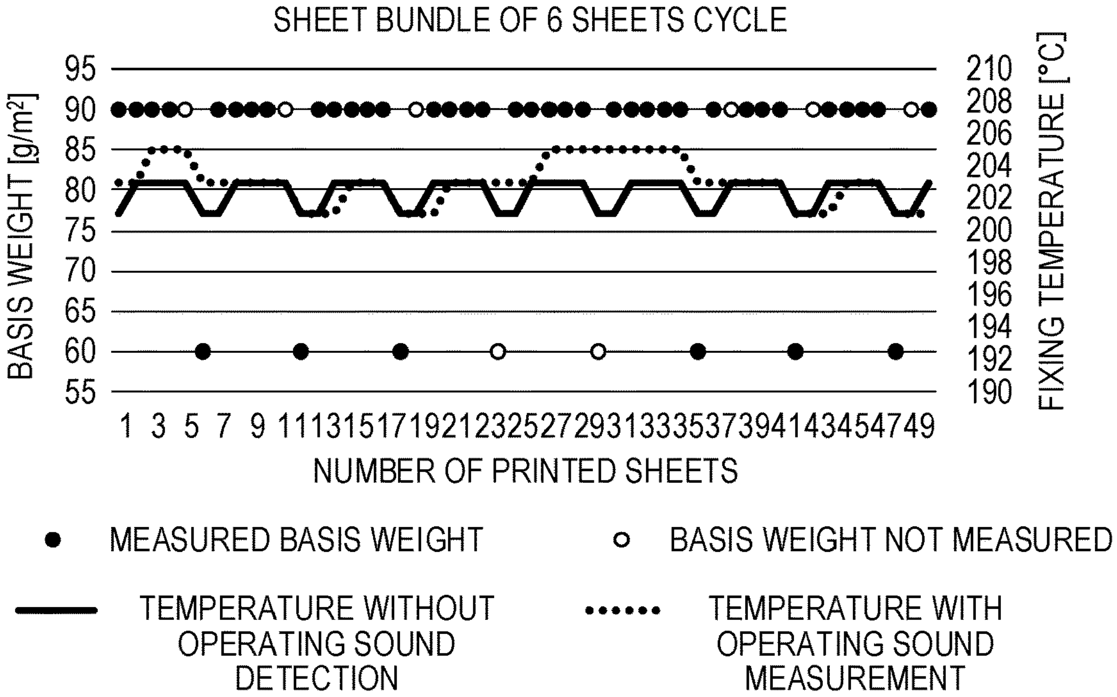
Figure 6E:
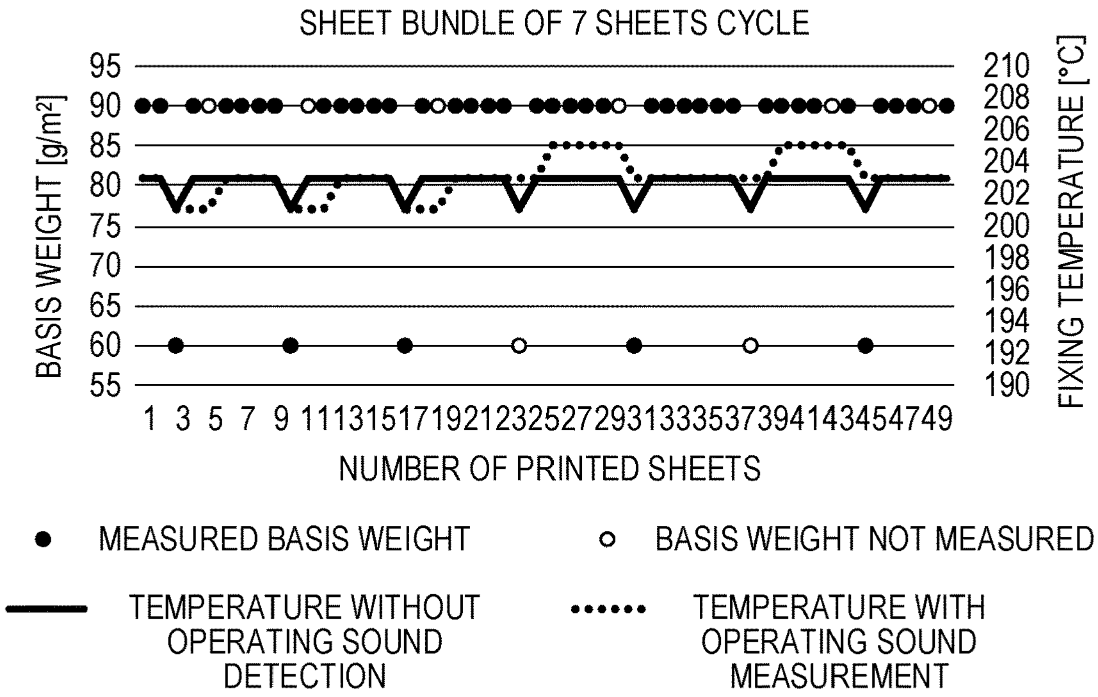
Figure 6F:
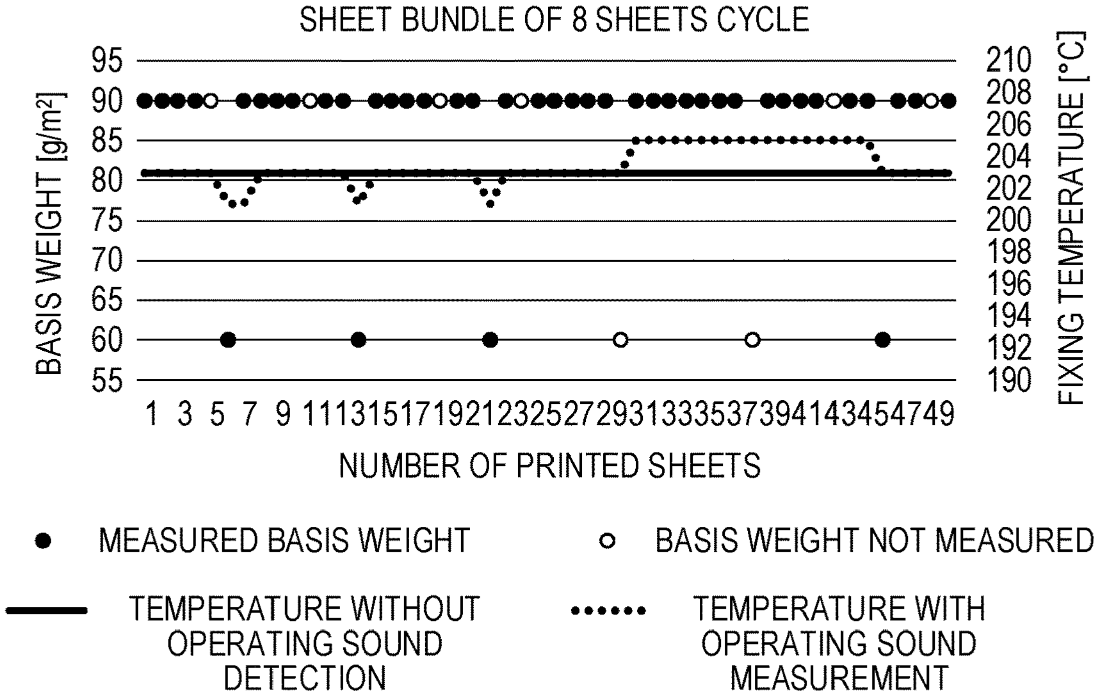

FIGS. 6C, 6D, 6E, and 6F are graphs illustrating changes in fixing temperature corresponding to results of detecting basis weights when the property cycles of the sheet 2 are 5 sheets, 6 sheets, 7 sheets, and 8 sheets cycles, respectively, in a case in which operating sound measurement is performed using the above-described set {5, 6, 8}. Concerning how to view the graphs, they are identical in that a bundle is periodic in a 5 to 8 sheets cycle. Here, a graph for a sheet bundle in which the cycle of properties is a 5 sheets cycle will be described as an example. In FIG. 6C, the vertical axis on the left side indicates the basis weight (g/m$^2$) of the sheet 2, the vertical axis on the right side indicates the fixing temperature (° C.) of the fixing unit 13, and the horizontal axis indicates the number of printed sheets as a fed sheet 2 (printing order) (first to fiftieth sheets). In addition, in a sheet bundle of 5 sheets cycle, the sheet 2 whose basis weights are 90 g/m$^2$, 90 g/m$^2$, 90 g/m$^2$, 90 g/m$^2$, and 60 g/m$^2$ are fed in the 5 sheets cycle. A black circle indicates a basis weight (measured basis weight) of a sheet 2 measured by detecting the basis weight, and a white circle indicates a basis weight (unmeasured basis weight) of a sheet 2 for which basis weight detection has not been performed because operating sound detection has been performed therefor. In addition, the solid-line graph indicates a change in fixing temperature of the fixing unit 13 (temperature without operating sound detection) corresponding to an average basis weight of the sheets 2 in a case in which the basis weight detection is performed without performing operating sound detection. Further, the broken-line graph indicates a change in fixing temperature (temperature with operating sound measurement) corresponding to an average basis weight of the sheets 2 in a case in which the operating sound detection is performed when a 5th sheet, an 11th sheet, a 19th sheet, a 24th sheet, a 30th sheet, a 38th sheet, a 43rd sheet, and a 49th sheet are fed in accordance with the above-described set {5, 6, 8}. In addition, the average basis weight is calculated on the basis of the basis weights of the latest eight sheets 2 for which the basis weight detection has been performed. In a sheet bundle of 6 sheets cycle, five sheets 2 having the basis weight of 90 g/m$^2$ are fed, and then one sheet 2 having the basis weight of 60 g/m$^2$ is fed. In a sheet bundle of 7 sheets cycle, six sheets 2 having the basis weight of 90 g/m$^2$ are fed, and then one sheet 2 having the basis weight of 60 g/m$^2$ is fed. Similarly, in a sheet bundle of 8 sheets cycle, seven sheets 2 having the basis weight of 90 g/m$^2$ are fed, and then one sheet 2 having the basis weight of 60 g/m$^2$ is fed.

In each of the graphs in which the cycles of properties of sheets 2 are 5 to 8 sheets cycles illustrated in FIGS. 6C, 6D, 6E, and 6F, it can be seen that, when the graph of the fixing temperature without the operating sound measurement (indicated by the solid line) is compared with the graph of the fixing temperature when the operating sound measurement is performed (indicated by the dotted line), the temperature varies within substantially the same range. Although there is an interval in which the average basis weight increases and the fixing temperature rises to 205° C. because the operating sound measurement is performed at a timing when the cycle in which the sheet 2 having a basis weight of 60 g/m$^2$ is fed and the value of the set for performing the operating sound measurement coincide with each other, the temperature immediately returns to the same temperature range as in the case without the operating sound measurement. This is because the operating sound measurement timing table is designed so that timings at which sheets 2 having the basis weight of 60 g/m$^2$, which greatly deviates in the property, are fed do not continuously coincide with timings at which sheets 2 are fed while the operating sound measurement is performed.

By determining an operating sound detection executing interval with reference to the timings determined on the basis of the above-described conditions 1 to 3 as described above, the receive mode selection portion 301 can prevent the assumed property cycles and the operating sound detection timings from continuously coinciding with each other. Note that, in a case in which it is desired to increase an operating sound detection executing frequency, but it is difficult to satisfy all of the three conditions, a set of the operating sound detection timings satisfying some of the conditions is used. For example, instead of the above-described set {5, 6, 8} of the operating sound detection timings, a set {2, 3, 4} that satisfies only the condition 1 but does not satisfy the conditions 2 and 3 is used. As a result, an effective operating sound detection frequency can be increased from an average interval of about six sheets (≈(5 sheets+6 sheets+8 sheets)/3) to an interval of three sheets (=(2 sheets+3 sheets+4 sheets)/3).

Sequence of Control by Receive Mode Selection Portion

Figure 7:
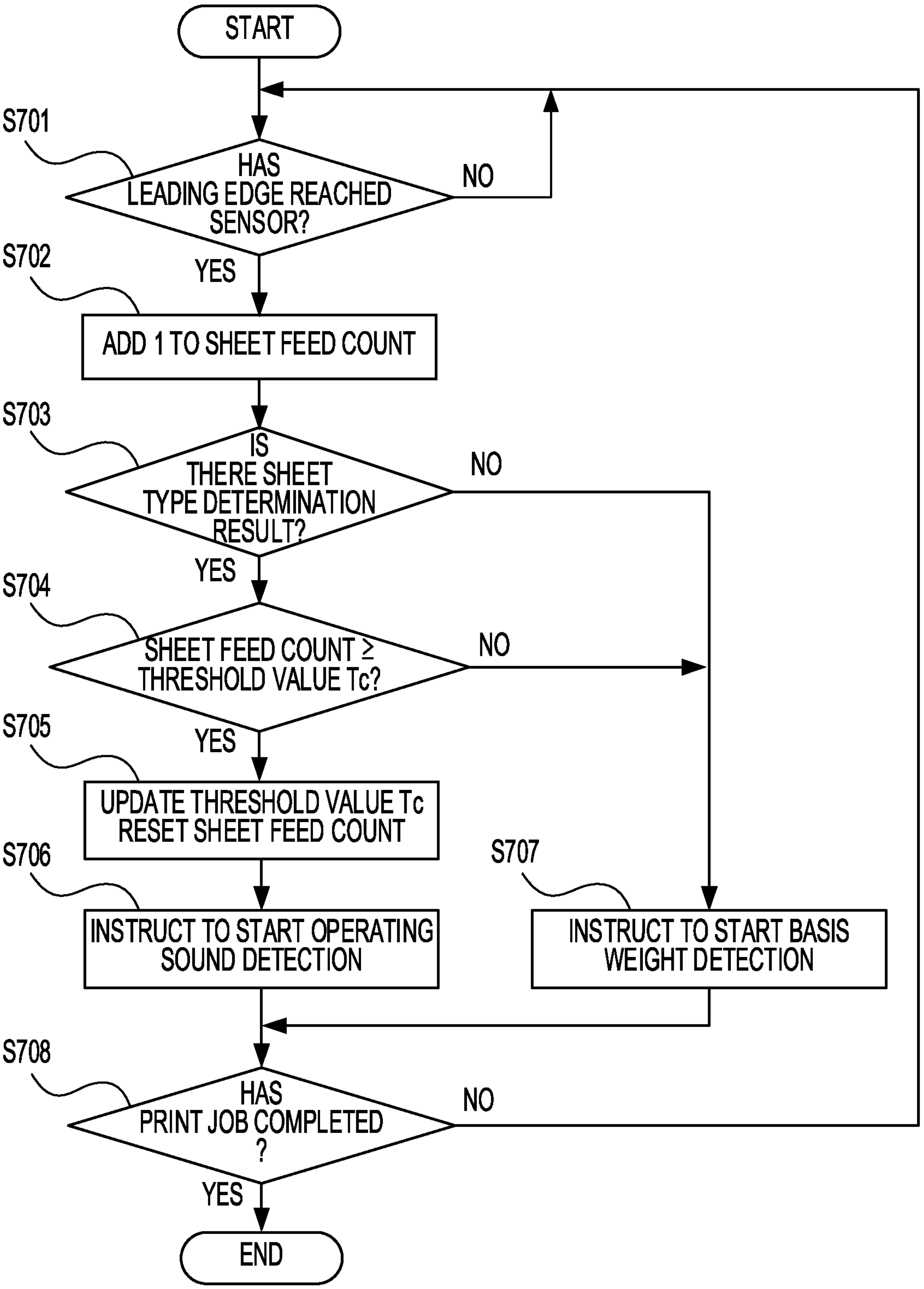
FIG. 7 is a flowchart illustrating a sequence of a control for basis weight detection and operating sound detection according to the first embodiment.

Next, a method in which the receive mode selection portion 301 performs a selection between a basis weight detection control and an operating sound detection control will be described. FIG. 7 is a flowchart illustrating a sequence of a control by the receive mode selection portion 301. In the printer 203, when receiving print data with a print instruction transmitted from the host computer 100, the video controller 204 transmits the print data including image information and the like with a print command to the engine controller 206. When the engine controller 206 receives the print data including image information and the like with the print command, the image forming controller 200 starts an image formation control. Specifically, the image forming controller 200 drives the scanner unit 10, drives the photosensitive drum 5 and various rollers such as the conveying roller 40, adjusts a temperature of the heater in the fixing unit 13, and the like. Then, in the image forming controller 200, the receive mode selection portion 301 is activated to perform the basis weight detection control and the operating sound detection control illustrated in FIG. 7 along with the above-described image formation control. Note that the processing of the receive mode selection portion 301 is executed by the CPU 207 of the engine controller 206. In addition, when the printer 203 is powered on and the CPU 207 of the engine controller 206 is activated, a sheet feed count indicating the number of fed sheets 2, which will be described later, is reset to 0.

In step (hereinafter, referred to as S) 701, the receive mode selection portion 301 determines whether a leading edge of a sheet 2 fed from the cassette tray 101 has reached the registration sensor 16 (Has a leading edge of a sheet reached the sensor?) on the basis of a detection result of the registration sensor 16. When the receive mode selection portion 301 determines that the leading edge of the sheet 2 has reached the registration sensor 16, the processing proceeds to S702, and when the receive mode selection portion 301 determines that the leading edge of the sheet 2 has not reached the registration sensor 16, the processing returns to S701. In S702, the receive mode selection portion 301 adds 1 to a value of the sheet feed count indicating the number of the sheets 2 fed from the cassette tray 101 after the latest operating sound detection is performed.

In S703, the receive mode selection portion 301 acquires a sheet type determination result with respect to the sheet 2 from the image forming controller 200, and determines whether the type of the sheet 2 fed from the cassette tray 101 has been determined (Is there a sheet type determination result?). Here, the sheet type determination result of the image forming controller 200 is a result of determining a type of sheets in a sheet bundle accommodated in the cassette tray 101 on the basis of the result of detecting the property (here, basis weights) of the sheet 2, which is acquired from the basis weight detection controller 302 by the image forming condition switching portion 300. In a case in which the receive mode selection portion 301 determines that the type of the sheet 2 has been determined, the processing proceeds to S704, and in a case in which the receive mode selection portion 301 determines that the type of the sheet 2 has not been determined, the processing proceeds to S707. Note that the determination result of the sheet type of the sheet 2 that the image forming controller 200 has is maintained until an operation of opening/closing the cassette tray 101 is performed after the basis weights of the sheets 2 are detected.

In S704, the receive mode selection portion 301 determines whether the sheet feed count is equal to or larger than the threshold value Tc (Sheet feed count≥threshold value Tc?). Here, the threshold value Tc is a value in the above-described table of FIG. 6B indicating the operating sound measurement timings. In the present embodiment, {5}, which is the first value in the table of FIG. 6B, is stored as the threshold value Tc at a timing when the engine controller 206 is activated. In a case in which the receive mode selection portion 301 determines that the sheet feed count is equal to or larger than the threshold value Tc, the processing proceeds to S705, and in a case in which the receive mode selection portion 301 determines that the sheet feed count is smaller than the threshold value Tc, the processing proceeds to S707.

In S705, the receive mode selection portion 301 selects an operating sound detection mode as a receive mode, updates a value set as the threshold value Tc, and resets the sheet feed count so that the sheet feed count is set to 0. Here, in order to update the value, set as the threshold value Tc, a subsequent value (here, 6) of the current threshold value Tc (here, 5) is acquired from the table of FIG. 6B indicating the operating sound measurement timings, and is set as the threshold value Tc. In a case in which the current threshold value Tc is the last value (8) in the table illustrated in FIG. 6B, the first value (5) in the table is acquired and set as the threshold value Tc. By using the table of FIG. 6B illustrating the operating sound measurement timings as described above, the control is realized so that the operating sound measurement executing timing and the cycle of sheet type properties of the sheets 2 do not coincide with each other. In S706, the receive mode selection portion 301 instructs the operating sound detection controller 305 to start measuring an operating sound of the printer 203 (second instruction), and then the processing proceeds to S708.

In S707, the receive mode selection portion 301 selects the basis weight detection mode as the receive mode and instructs the basis weight detection controller 302 to start measuring the basis weight (first instruction). Then, the processing proceeds to S708. In S708, the receive mode selection portion 301 acquires print job information from the image forming controller 200, and determines whether or not the print job has been completed (Has the print job been completed?) on the basis of the acquired information. In a case in which the receive mode selection portion 301 determines that the print job has not been completed, the processing returns to S701, and in a case in which the receive mode selection portion 301 determines that the print job has been completed, the processing ends.

In the present embodiment, the method in which the receive mode selection portion 301 selects which detection is to be executed between the basis weight detection and the operating sound detection considering the cycle of properties of the sheets 2 has been described above. By considering the cycle of properties of the sheets 2, it is possible to reduce deviations in the basis weight detection results and execute an operation of forming an image under appropriate image forming conditions on the basis of the basis weight detection results. In addition, by setting a target of operating sound detection to an entire sheet for each sheet 2 (for each recording material), it is possible to detect an abnormal operation sound generated at a certain timing while conveying the sheet 2.

As described above, according to the present embodiment, it is possible to achieve both accurate detection of properties of recording materials and detection of operating sounds.

Second Embodiment

In the first embodiment, it has been described that the mode selection is performed considering the cycle of properties using the image forming apparatus capable of single-sided printing with one cassette tray serving as a sheet feeding port. In the second embodiment, it will be described that the mode selection is performed considering the cycle of properties using an image forming apparatus including a duplex conveying unit, enabling double-sided printing, with an additional cassette tray, in addition to the configuration of the first embodiment.

Configuration of Image Forming Apparatus

Figure 8:
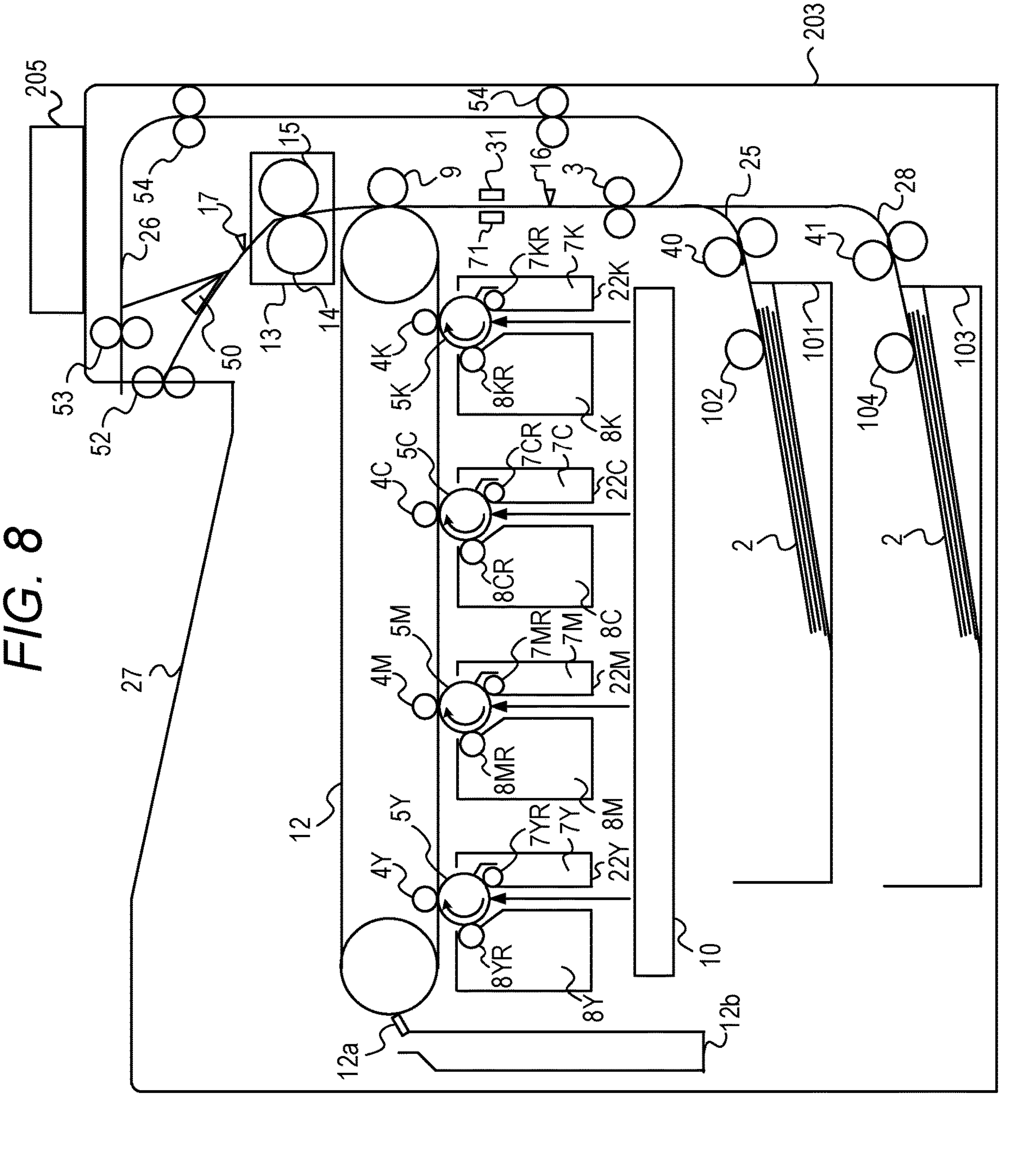
FIG. 8 is a cross-sectional view illustrating a configuration of an image forming apparatus according to the second embodiment.

FIG. 8 is a cross-sectional view illustrating a schematic configuration of a tandem printer 203 in which a plurality of image forming units are arranged in parallel according to the present embodiment. As compared with the printer 203 of the first embodiment illustrated in FIG. 1, the printer 203 of the present embodiment is different in that a cassette tray 103 configured to feed the sheet 2 is added, and a duplex conveying unit configured to convey the sheet 2 whose one side is printed is added to perform double-sided printing.

Similar to the cassette tray 101, the cassette tray 103 is a stack portion on which sheets 2 as recording materials are accommodated and stacked. When an electromagnetic clutch (not shown) is set to a turn-on state, a driving force from a motor (not shown) is transmitted to a feed roller 104. Then, the feed roller 104 rotates in the counterclockwise direction in FIG. 8, and one sheet 2 is fed from the cassette tray 103. A conveying roller 41 as a conveyance unit conveys the sheet 2 fed by the feed roller 104 to a conveying path 28. The conveying path 28 joins the conveying path 25, through which the sheet 2 fed from the cassette tray 101 is conveyed, on the way. After the sheet 2 is conveyed by the conveying roller 41, the electromagnetic clutch is set to a turn-off state, thereby releasing the transmission of the driving force to the feed roller 104 and stopping the feed roller 104.

The duplex conveying unit configured to perform double-sided printing on the sheet 2 includes a duplex flapper 50, a duplex conveying path 26, a reverse roller 53, a duplex conveying roller 54, a flapper solenoid (not shown), a reverse motor (not shown), and a duplex motor (not shown). In a case in which the print command from the video controller 204 is the double-sided printing, the flapper solenoid (not shown) is turned on, and a tip of the duplex flapper 50 is oriented in the downward direction of FIG. 8. As a result, the direction in which the sheet 2 conveyed from the fixing unit 13 is to be conveyed is switched from a direction toward the discharge roller 52 to a direction toward the reverse roller 53. Then, by rotating the reverse motor (not shown) forward, the reverse roller 53 conveys the sheet 2 having a toner image fixed onto a first surface of the sheet 2 in a direction to be discharged to the discharge tray 27. Thereafter, the rotation direction of the reverse motor (not shown) is switched from the forward direction to a reverse direction at a timing when the fixing discharge sensor 17 detects a trailing edge of the sheet 2, thereby conveying the sheet 2 in a direction toward the duplex conveying path 26. The duplex conveying roller 54 is driven by the duplex motor (not shown) to convey the sheet 2 to a junction of the duplex conveying path 26 and the conveying path 25. Thereafter, the sheet 2 reaches the registration roller 3 again in a state in which the front side and the back side of the sheet 2 are reversed, and is conveyed to the transfer nip portion. In the transfer nip portion, a toner image on the intermediate transfer belt 12 is transferred onto a second surface of the sheet 2. The toner image transferred onto the sheet 2 is heated and pressed by the fixing unit 13 to be fixed to the second surface of the sheet 2. Then, the flapper solenoid (not shown) is turned off, and the orientation of the tip of the duplex flapper 50 is changed from the downward direction to the upward direction of FIG. 8, so that the direction in which the sheet 2 conveyed from the fixing unit 13 is to be conveyed is switched to a direction toward the discharge roller 52, and the double-sided printed sheet 2 is discharged to the discharge tray 27.

Configuration of Control Unit

A configuration of a control unit of the printer 203 of the present embodiment is the same as the configuration of the first embodiment illustrated in FIG. 2, and the same configuration will be described using the same reference signs, and the description thereof will be omitted here.

Functional Blocks Concerning Detection of Basis Weight of Recording Material and Detection of Operating Sound A functional block configuration of an engine controller in the present embodiment is the same as the configuration of the first embodiment illustrated in FIG. 3, and the description thereof will be omitted here. Note that the cassette tray 103 and the duplex conveying unit are added to the printer 203 of the present embodiment. Thus, at the time of an image forming operation in response to a print command from the video controller 204, the image forming controller 200 performs a control to feed the sheet 2 from the cassette tray 101 or the cassette tray 103. In addition, in a case in which the print command from the video controller 204 is the double-sided printing, the image forming controller 200 performs a control to turn on and off the flapper solenoid (not shown) depending on whether to print the first surface or the second surface of the sheet 2. Accordingly, the image forming controller 200 performs a control to switch where the sheet 2 is to be conveyed (discharge roller 52 or reverse roller 53).

Description of Registration Stop Conveyance Control and Operating Sound Measurement In addition to the above-described control, the image forming controller 200 of the present embodiment starts the image forming operation after confirming the arrival of the sheet 2 in the registration sensor 16 in order to suppress the consumption of the toner when a sheet jamming has occurred. In this case, the sheet 2 reaches the secondary transfer roller 9 before the toner image on the intermediate transfer belt 12 reaches the transfer nip portion. For this reason, the image forming controller 200 executes a registration stop conveyance control (first conveyance mode) to temporarily stop the conveyance of the sheet 2 in front of the secondary transfer roller 9 and then resume the conveyance. The image forming controller 200 performs not only the registration stop conveyance control but also a registration non-stop conveyance control (second conveyance mode) to convey the sheet 2 to the transfer nip portion without temporarily stopping the conveyance of the sheet 2 in front of the secondary transfer roller 9. The image forming controller 200 of the present embodiment performs the registration stop conveyance control with respect to a first sheet 2 in a print job at all times.

When the operating sound measurement is performed with respect to the sheet 2 conveyed under the registration stop conveyance control, there is an advantage in that the operating sound measurement focusing on operating sounds other than those generated during the conveyance control can be performed. Specifically, while the conveyance of the sheet 2 is temporarily stopped under the registration stop conveyance control, the following sounds are not generated: sounds when the sheet 2 slides on the conveying path; sounds when the registration roller 3 and the conveying roller 40 rotate; and sounds when the motor, which is a drive source, is activated and a gear transmitting a driving force of the motor to each of the rollers is driven. Accordingly, sounds generated when other image forming units are driven (e.g., sounds when the intermediate transfer belt 12, the photosensitive drum 5, the fixing unit 13, and the like rotate) can be detected relatively, enabling the operating sound diagnostic controller 308 to analyze a main cause of an abnormal operating sound in more detail.

Thus, in a case in which the basis weight detection mode is selected for 20 consecutive sheets 2 on which the registration stop conveyance control is to be performed, the receive mode selection portion 301 of the present embodiment performs a control to switch the mode to the operating sound measurement mode. As a result, the operating sound measurement focusing on operating sounds other than those generated during the conveyance control can be performed at a constant frequency, thereby analyzing an abnormal operating sound in detail. A specific method thereof will be described later.

Method for Selecting Receive Mode

In the present embodiment, since the cassette tray 103 and the duplex conveying unit are added to the printer 203, there are three conveying routes for conveying the sheet 2 to the conveying path on which the receiver 71 is provided. Specifically, the three conveying routes include a route for conveying the sheet 2 from the cassette tray 101, a route for conveying the sheet 2 from the cassette tray 103, and a route for conveying the sheet 2 of which one side has been printed from the duplex conveying unit.

The cycle characteristic of properties of the sheets 2 described in the first embodiment will be discussed for each conveying path. First, different bundles of the sheets 2 may be stacked on the cassette tray 101 and the cassette tray 103, with independent cycles of properties of the sheets 2. Thus, in the present embodiment, the sheet feed count and the threshold value Tc obtained from the operating sound measurement timing table illustrated in FIG. 6B are independently managed for each cassette tray. As a result, it is possible to perform operating sound measurement considering the cycle of the properties of the stacked sheets 2 for each cassette tray.

In addition, since a toner image has already been transferred and fixed onto the sheet 2 conveyed from the duplex conveying unit to the receiver 71, the basis weight of the sheet 2 has changed. Thus, the sheet 2 may be inappropriate for the receiver 71 to detect its basis weight. Therefore, in the present embodiment, all of the sheets 2 having been conveyed from the duplex conveying path 26 are conveyed in the operating sound detection mode. Note that, although the printer 203 of the present embodiment includes two tray units, even in a case in which three or more tray units included, the sheet feed count and the threshold value may be managed independently for each tray unit. As a result, as in the case in which two tray units are included, it is possible to perform operating sound measurement considering the cycle of the properties of the stacked sheets 2 for each cassette tray.

Sequence of Control by Receive Mode Selection Portion

Figure 9:
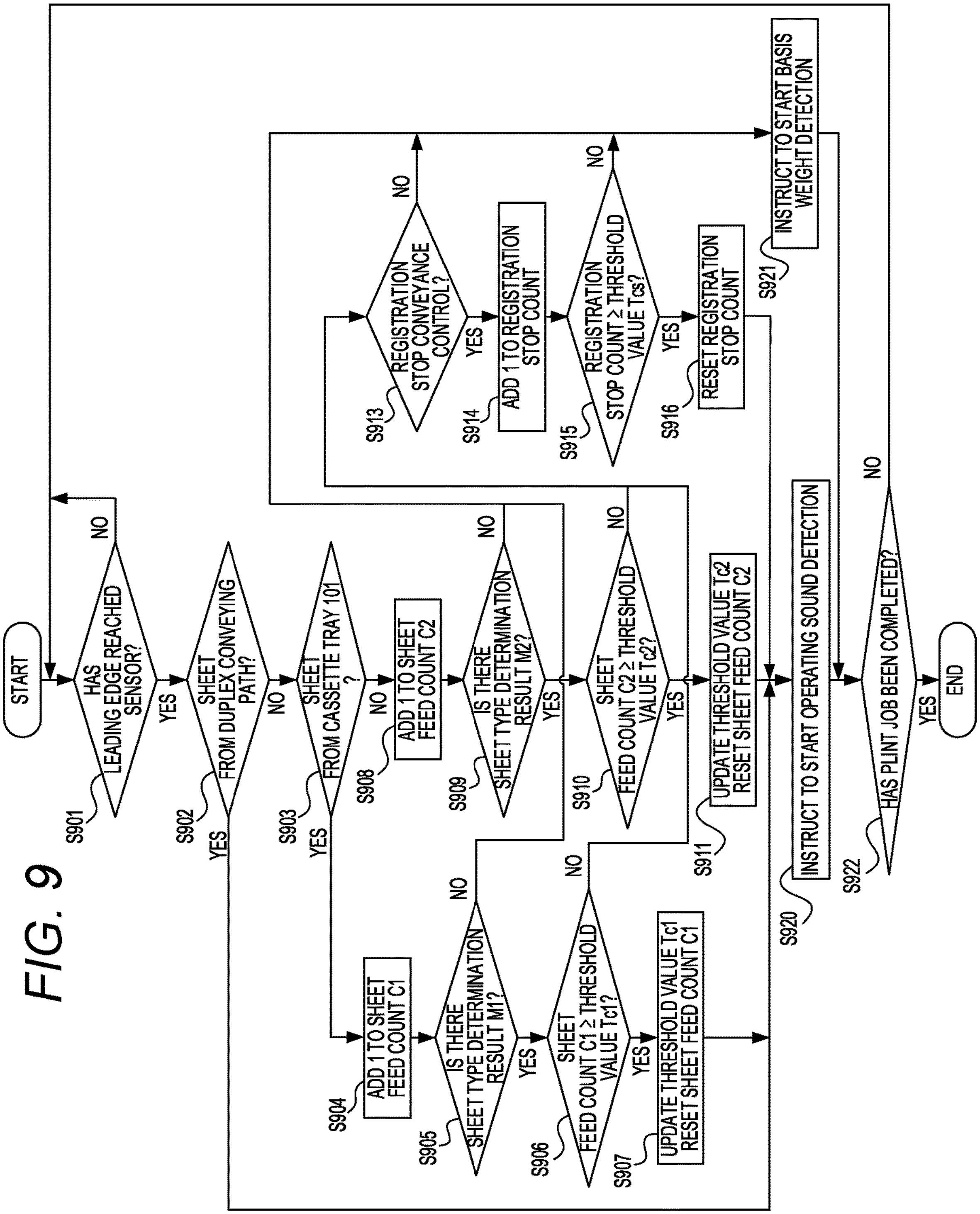
FIG. 9 is a flowchart illustrating a sequence of a control for basis weight detection and operating sound detection according to the second embodiment.

Next, in the present embodiment, a method in which the receive mode selection portion 301 performs the selection between the basis weight detection control and the operating sound detection control will be described. FIG. 9 is a flowchart illustrating a sequence of a control by the receive mode selection portion 301. Since the flow until the receive mode selection portion 301 starts processing illustrated in the flowchart of FIG. 9 is the same as that of the first embodiment, the description thereof will be omitted. The processing of the receive mode selection portion 301 is executed by the CPU 207 of the engine controller 206. In addition, in a case in which the printer 203 is powered on and the CPU 207 of the engine controller 206 is activated, sheet feed counts C1 and C2 indicating the numbers of the sheets 2 fed from the cassette trays 101 and 103, respectively, and a registration stop count, which will be described later, are reset to 0.

In S901, the receive mode selection portion 301 determines whether a leading edge of a fed sheet 2 has reached the registration sensor 16 (Has a leading edge of a sheet reached the sensor?) on the basis of a detection result of the registration sensor 16. In a case in which the receive mode selection portion 301 determines that the leading edge of the sheet 2 has reached the registration sensor 16, the processing proceeds to S902, and in a case in which the receive mode selection portion 301 determines that the leading edge of the sheet 2 has not reached the registration sensor 16, the processing returns to S901.

In S902, the receive mode selection portion 301 acquires information regarding a feeding source of the sheet 2 from the image forming controller 200, and determines whether the sheet 2 has been conveyed from the duplex conveying path 26 of the duplex conveying unit (The sheet from the duplex conveying path?). In a case in which the receive mode selection portion 301 determines that the sheet 2 has been conveyed from the duplex conveying path 26 of the duplex conveying unit, the processing proceeds to S920 in order to perform operating sound detection. On the other hand, in a case in which the receive mode selection portion 301 determines that the sheet 2 has not been conveyed from the duplex conveying path 26 of the duplex conveying unit (the sheet 2 has fed from the cassette tray 101 or the cassette tray 103), the processing proceeds to S903.

In S903, the receive mode selection portion 301 determines whether the sheet 2 is a sheet having been fed from the cassette tray 101 (The sheet from the cassette tray 101?) on the basis of the information regarding the feeding source of the sheet 2 acquired from the image forming controller 200. In a case in which the receive mode selection portion 301 determines that the sheet 2 is a sheet having been fed from the cassette tray 101, the processing proceeds to S904. On the other hand, in a case in which the receive mode selection portion 301 determines that the sheet 2 is not a sheet having been fed from the cassette tray 101 (the sheet having been fed from the cassette tray 103), the processing proceeds to S908.

In S904, the receive mode selection portion 301 adds 1 to a value of the sheet feed count C1 indicating the number of the sheets 2 fed from the cassette tray 101 after the latest operating sound detection is performed. In S905, the receive mode selection portion 301 acquires a sheet type determination result M1 with respect to the sheet 2 of the cassette tray 101 from the image forming controller 200, and determines whether the type of the sheet 2 fed from the cassette tray 101 has been determined (Is there a sheet type determination result M1?). Here, the sheet type determination result M1 is a result of determining a sheet type of sheets in a sheet bundle accommodated in the cassette tray 101 on the basis of the result of detecting the property (here, basis weights) of the sheet 2 fed from the cassette tray 101, which is acquired from the basis weight detection controller 302 by the image forming condition switching portion 300. In a case in which the receive mode selection portion 301 determines that the type of the sheet 2 fed from the cassette tray 101 has been determined, the processing proceeds to S906, and in a case in which the receive mode selection portion 301 determines that the type of the sheet 2 has not been determined, the processing proceeds to S921. Note that the sheet type determination result with respect to the sheet 2 fed from the cassette tray 101 that the image forming controller 200 has is maintained until the operation of opening/closing the cassette tray 101 is performed after the basis weight of the sheet 2 is detected.

In S906, the receive mode selection portion 301 determines whether the sheet feed count C1 for the cassette tray 101 is equal to or larger than the threshold value Tc1 for the cassette tray 101 (Sheet feed count C1≥threshold value Tc1?). Here, the threshold value Tc1 is a value in the above-described table of FIG. 6B indicating the operating sound measurement timings. In the present embodiment, {5}, which is the first value in the table of FIG. 6B, is stored as the threshold value Tc at a timing when the engine controller 206 is activated. In a case in which the receive mode selection portion 301 determines that the sheet feed count C1 is equal to or larger than the threshold value Tc1, the processing proceeds to S907, and in a case in which the receive mode selection portion 301 determines that the sheet feed count is smaller than the threshold value Tc1, the processing proceeds to S913. In S907, the receive mode selection portion 301 selects the operating sound detection mode as the receive mode, updates a value set as the threshold value Tc1 for the cassette tray 101, and resets a sheet feed count C1 for the cassette tray 101 so that the sheet feed count C1 is set to 0. Here, in order to update the value, set as the threshold value Tc1, a subsequent value (here, 6) of the current threshold value Tc1 (here, 5) is acquired from the table of FIG. 6B indicating the operating sound measurement timings, and is set as the threshold value Tc1. When the current threshold value Tc1 is the last value (8) in the table illustrated in FIG. 6B, the first value (5) in the table is acquired and set as the threshold value Tc1.

The processing of S908, S909, S910, and S911 are executed in a case in which the receive mode selection portion 301 determines that the sheet 2 is a sheet having been fed from the cassette tray 103 in the processing of S903. The processing of S908, S909, S910, and S911 is processing on the sheet 2 fed from the cassette tray 103, which corresponds to the processing of S904, S905, S906, and S907 on the sheet 2 fed from the cassette tray 101, respectively. The difference between the processing of S904 to S907 and the processing of S908 to S911 is as follows. That is, the difference is that while the sheet type determination result M1, the sheet feed count C1, and the threshold value Tc1 for the cassette tray 101 are used in the processing of S904 to S907, a sheet type determination result M2, a sheet feed count C2, and a threshold value Tc2 for the cassette tray 103 are used in the processing of S908 to S911. Although the processing is separately performed for each cassette tray as described above, the processing of S908 to S911 corresponds to the processing of S904 to S907, respectively, with the same processing details. Thus, the description of the processing details will be omitted. In the processing of S904 to S907 and the processing of S908 to S911, controls are independently executed considering the cycles of properties of the cassette trays 101 and 103.

In S913, the receive mode selection portion 301 acquires registration stop conveyance control information from the image forming controller 200, and determines whether the sheet 2 is a target of the registration stop conveyance control (Registration stop conveyance control?) on the basis of the acquired registration stop conveyance control information. In a case in which the receive mode selection portion 301 determines that the sheet 2 is a target of the registration stop conveyance control, the processing proceeds to S914, and in a case in which the receive mode selection portion 301 determines that the sheet 2 is not a target of the registration stop conveyance control, the processing proceeds to S921. In S914, the receive mode selection portion 301 adds 1 to a value of the registration stop count indicating the number of times the basis weight detection mode has been continuously selected for the sheets 2 that are targets of the registration stop conveyance control. In S915, the receive mode selection portion 301 determines whether the registration stop count is equal to or larger than the threshold value Tcs (Registration stop count≥threshold value Tcs?). In a case in which the receive mode selection portion 301 determines that the registration stop count is equal to or larger than the threshold value Tcs, the processing proceeds to S916, and in a case in which the receive mode selection portion 301 determines that the registration stop count is smaller than the threshold value Tcs, the processing proceeds to S921. Note that the threshold value Tcs is a predetermined number of the sheets 2 to be fed, and the threshold value Tcs is set to 20 in the present embodiment. Accordingly, in the present embodiment, the operating sound measurement focusing on operating sounds other than those generated during the conveyance control can be performed at least once every 20 print jobs. In S916, the receive mode selection portion 301 resets the registration stop count to 0, and the processing proceeds to S920.

In S920, the receive mode selection portion 301 instructs the operating sound detection controller 305 to start measuring an operating sound of the printer 203, and then the processing proceeds to S922. In S921, the receive mode selection portion 301 selects the basis weight detection mode as the receive mode and instructs the basis weight detection controller 302 to start measuring the basis weight. Then, the processing proceeds to S922. In S922, the receive mode selection portion 301 acquires print job information from the image forming controller 200, and determines whether or not the print job has been completed (Has the print job been completed?) on the basis of the acquired information. In a case in which the receive mode selection portion 301 determines that the print job has not been completed, the processing returns to S901, and in a case in which the receive mode selection portion 301 determines that the print job has been completed, the processing ends.

In the present embodiment in which the printer 203 has the plurality of cassette trays 101 and 103 with the double-sided printing function, the method of determining the operating sound measurement timing considering the cycles of properties of the sheets 2 stacked on the cassette trays 101 and 103 has been described above. By considering the cycle characteristic of properties of the sheets 2 stacked on each cassette tray, it is possible to reduce deviations in results of detecting the basis weights of the sheets 2. Furthermore, by determining whether the sheet 2 has been fed from the duplex conveying path, it is possible to increase the operating sound measurement frequency.

In addition, in the present embodiment, the method of determining the operating sound measurement timing considering the influence of the sheet conveyance control on the operating sound measurement has also been described. By controlling the frequency of executing the operating sound measurement at the time of the registration stop conveyance control under which the sheet being conveyed is temporarily stopped, it is possible to increase the frequency of detecting abnormal operation sounds generated at places other than the sheet conveying units.

As described above, according to the present embodiment, it is possible to achieve both accurate detection of properties of recording materials and detection of operating sounds.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a stack portion on which recording materials are to be stacked;

a feeding unit configured to feed each of the recording materials stacked on the stack portion;

an image forming unit configured to form an image on each recording material of the recording materials fed by the feeding unit;

a transmitter configured to transmit an ultrasonic wave;

a receiver configured to receive the ultrasonic wave transmitted from the transmitter via the recording material and an operating sound generated in the image forming apparatus;

a basis weight detection unit configured to detect a value corresponding to a basis weight of the recording material based on the ultrasonic wave received by the receiver;

an operating sound detection unit configured to detect an abnormality based on the operating sound received by the receiver; and a mode selection unit configured to select, for each of the recording materials fed to the image forming unit, between a first mode in which the basis weight detection unit detects the value and a second mode in which the operating sound detection unit detects the abnormality, wherein the mode selection unit selects the second mode for a first recording material, a second recording material, and a third recording material fed from the feeding unit, wherein the mode selection unit performs the first mode for at least one or more recording materials fed between the first recording material and the second recording material and for at least one or more recording materials fed between the second recording material and the third recording material, and wherein a number of the at least one or more recording materials fed between the first recording material and the second recording material is different from a number of the at least one or more recording materials fed between the second recording material and the third recording material.

2. The image forming apparatus according to claim 1, wherein the mode selection unit has a set of integers in which two or more different positive integers are arranged to determine an interval at which each second mode is selected, and is configured to cyclically extract an integer in a predetermined order from the set of integers and to set the extracted integer as an interval between recording materials at which the second mode is to be selected next.

3. The image forming apparatus according to claim 2, wherein the integers included in the set of integers satisfy at least one condition of the following conditions: (i) a condition that a sum of the integers included in the set of integers is larger than a maximum value of an assumed cycle of properties of the recording materials, (ii) a condition that the sum of the integers included in the set of integers is relatively prime to the assumed cycle of the properties, and (iii) a condition that, in a case in which the integers included in the set of integers are divided into two or more groups, any greatest common divisor of a sum of each group of the two or more groups and a sum of a second group adjacent to a first group in a permutation does not coincide with the assumed cycle of the properties.

4. The image forming apparatus according to claim 3, wherein the stack portion includes a plurality of stack portions, and wherein the mode selection unit is configured to select the first mode or the second mode for each of the recording materials fed from each of the plurality of stack portions.

5. The image forming apparatus according to claim 4, wherein the feeding unit is configured to operate in a first conveyance mode and in a second conveyance mode, where the first conveyance mode is operable to temporarily stop conveyance of the recording material fed from the stack portion in a middle of a conveying path leading to the image forming unit, and then resume the conveyance to convey the recording material to the image forming unit, and the second conveyance mode is operable to convey the recording material fed from the stack portion to the image forming unit without stopping the recording material, and wherein, in a case in which the first instruction has been continuously selected for each of a predetermined number or more of recording materials conveyed in the first conveyance mode, the mode selection unit switches mode from the first mode to the second mode.

6. The image forming apparatus according to claim 5, further comprising a duplex conveying path provided for forming images on both sides of the recording material, wherein the mode selection unit is configured to select the second mode for the recording material conveyed from the duplex conveying path.

7. The image forming apparatus according to claim 1, wherein the basis weight detection unit includes a calculation unit configured to calculate an attenuation coefficient of the recording material based on a result of the receiver receiving the ultrasonic wave via the recording material, and wherein the basis weight detection unit is configured to detect the value based on the attenuation coefficient calculated by the calculation unit.

8. The image forming apparatus according to claim 1, wherein the value is an average value of basis weights of a predetermined number of recording materials most recently detected by the basis weight detection unit.

9. The image forming apparatus according to claim 1, wherein the image forming unit includes a fixing unit configured to fix a formed image to the recording material by heating the formed image, and wherein the image forming unit is configured to change a temperature, at which the fixing unit heats the formed image, according to the detected value.

10. The image forming apparatus according to claim 1, wherein the operating sound detection unit is configured to extract operating sound data of a target member by filtering the operating sound received by the receiver.

11. The image forming apparatus according to claim 10, further comprising:

an operating sound diagnostic unit configured to diagnose generation of an abnormal sound of the target member based on the operating sound data extracted by the operating sound detection unit; and a display unit configured to display information, wherein, in a case in which the operating sound diagnostic unit diagnoses that the abnormal sound of the target member has been generated, the operating sound diagnostic unit causes the display unit to display the generation of the abnormal sound of the target member.

* * * * *